April 19, 1966 J. C. LESHER 3,247,482
TRAFFIC CONTROL SYSTEMS
Filed May 26, 1961 11 Sheets-Sheet 7

INVENTOR
JOHN C. LESHER

BY

ATTORNEYS

April 19, 1966   J. C. LESHER   3,247,482
TRAFFIC CONTROL SYSTEMS

Filed May 26, 1961   11 Sheets-Sheet 9

INVENTOR
JOHN C. LESHER

BY *Kimmel & Crowell*
ATTORNEYS

April 19, 1966 J. C. LESHER 3,247,482
TRAFFIC CONTROL SYSTEMS
Filed May 26, 1961 11 Sheets-Sheet 11

INVENTOR
JOHN C. LESHER
BY
Kimmel & Crowell
ATTORNEYS

United States Patent Office
3,247,482
Patented Apr. 19, 1966

3,247,482
TRAFFIC CONTROL SYSTEMS
John C. Lesher, Erie, Pa., assignor, by mesne assignments, to Rad-O-Lite, Inc., Philadelphia, Pa., a corporation of Pennsylvania, and Martha H. Egly and Michael J. Manchester
Filed May 26, 1961, Ser. No. 120,843
12 Claims. (Cl. 340—41)

The present invention relates to traffic light conrtol systems and, more particularly, to a traffic light control system permitting emergency vehicles to obtain control of traffic lights along the direction of travel of the emergency vehicle in order to cause an array of lights to be displayed in accordance with signals received from the emergency vehicle.

It is an object of the present invention to provide a traffic light system which, under the control of signals broadcast by an emergency vehicle, displays a predetermined array of traffic signals and simultaneously energizes blinker lights indicating the direction of travel of the emergency vehicle.

It is another object of the present invention to provide a traffic light system over which an emergency vehicle may obtain control, the system employing a receiver having a separate channel for processing distinct subcarrier signals, one of the channels being rendered inoperative when the other channel detects its subcarrier.

It is still another object of the present invention to provide a traffic light control system which, once an emergency vehicle has obtained control of a light, prevents loss of control due to fading signals, said system including circuits for increasing the gain of the receiver as soon as a signal broadcast by the emergency vehicle is received.

It is still another object of the present invention to provide a traffic light system permitting an emergency vehicle to obtain control over the traffic lights of the system, the appartus including a receiver, the gain of which is controlled as a function of both carrier and subcarrier energy.

Yet another object of the present invention is to provide a traffic light control system responsive to signals generated by an emergency vehicle in which the emergency vehicle broadcasts carrier signals selectively modulated by various subcarrier signals which subcarrier signals are in turn selectively modulated by control tones and in which the receiver includes a separate channel for processing the information contained on each subcarrier signal, and circuits responsive to the control tones developed by each channel for obtaining control over the traffic lights, the latter circuit elements being interconnected such that, when one of the circuit elements is actuated, the other circuit element is rendered inoperative.

It is yet another object of the present invention to provide a traffic light control system over which emergency vehicles may obtain control and in which numerous safety features are provided in order to prevent vehicles travelling on intersecting streets from obtaining concurrent control of the lighting system and to provide a display indicating the direction of approach of the emergency vehicle which has obtained control of the system.

Still another object of the present invention is to provide a traffic light control system for operation by emergency vehicles, which system includes a radio receiver for receiving signals broadcast by the emergency vehicle and which, in response to a predetermined control signal, sets up a predetermined display of traffic lights and de-energizes the radio receiver so that, during civilian defense emergencies, a specific prescribed array is obtained which cannot be changed.

It is another object of the present invention to provide a control system for traffic light signals which is operated in response to signals generated by an emergency vehicle and including a subsystem permitting a selection of various arrays of lights depending upon the specific arrangement desired in a specific locale.

It is yet another object of the present invention to provide a traffic light control system for use with emergency vehicles, the system normally displaying green lights along the street of progress of the emergency vehicle and responding to a predetermined control tone to change the green light facing in the direction opposite to the direction of movement of the emergency vehicle to a red signal in order to permit a safe left turn by the emergency vehicle.

Another object of the present invention is to provide an emergency traffic light system for operation by an emergency vehicle in which the vehicle may obtain control over the system when it is in off-hour blinking condition and produce constant energization of the red and/or green lights in accordance with the desired display and which system meets all safety standards requisite to stopping traffic along cross streets prior to initially changing the display pattern and prior to returning the display pattern to its initial blinking condition.

The above and still further objects, features and advantages of the present invention will become apparent upon consideration of the following detailed description of one specific embodiment thereof, especially when taken in conjunction with the accompanying drawings, wherein:

FIGURE 1 of the accompanying drawings is a partial electrical circuit and block diagram of the transmitter unit mounted in an emergency vehicle;

Figure 3:
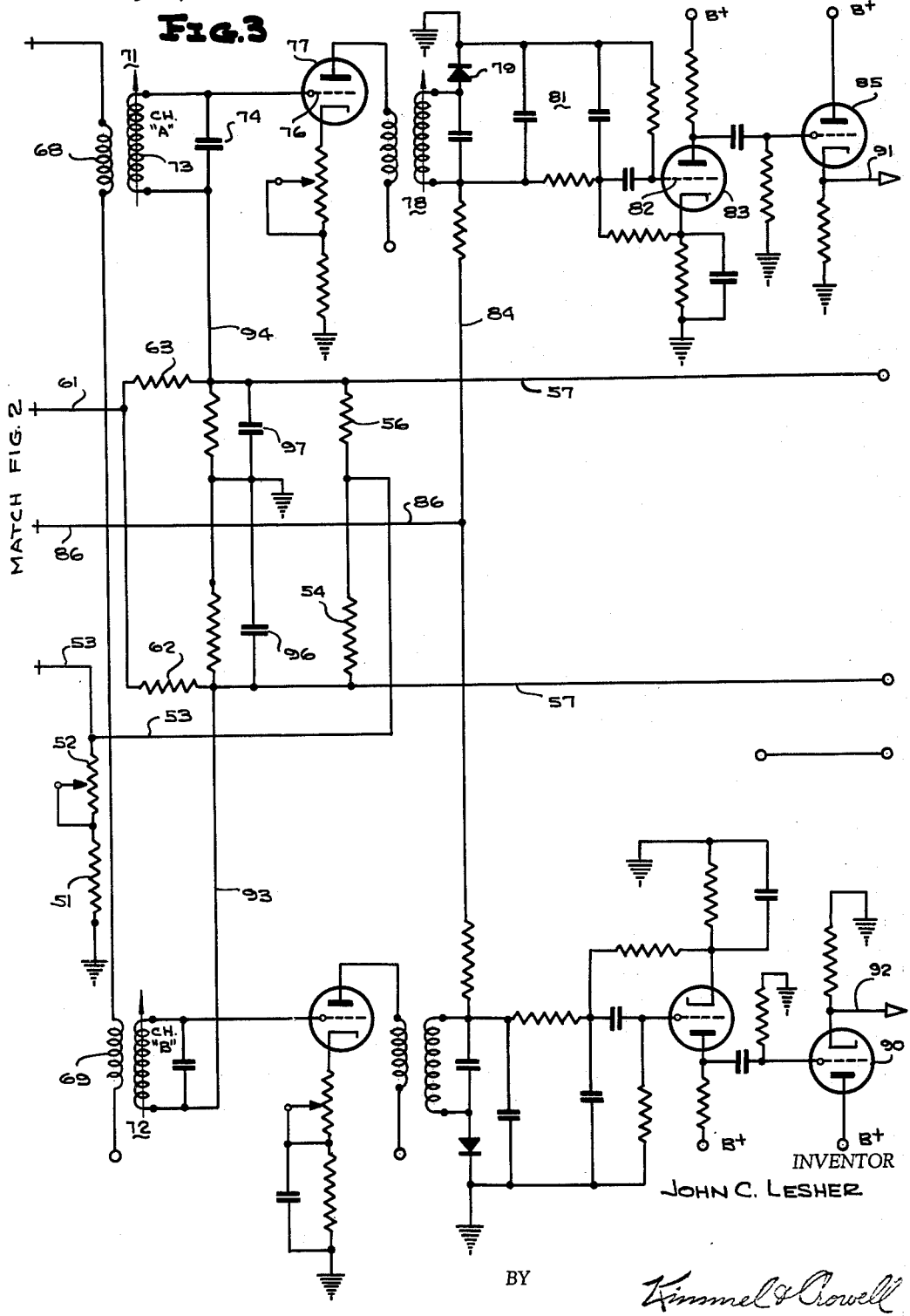
FIGURE 3 is an electrical circuit diagram of the circuitry providing the various channels of the receiver system.
Figure 4:
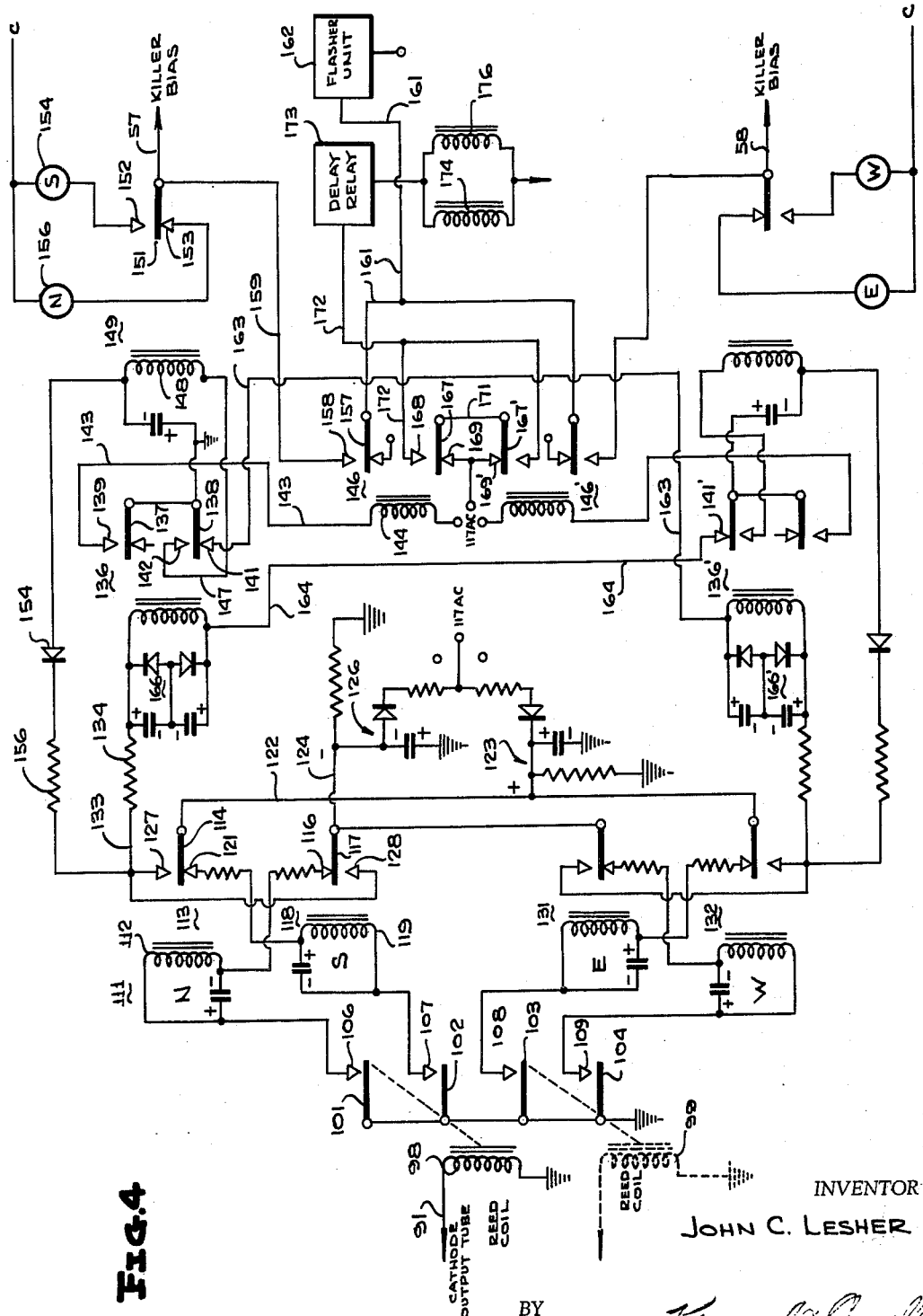
Figure 5:
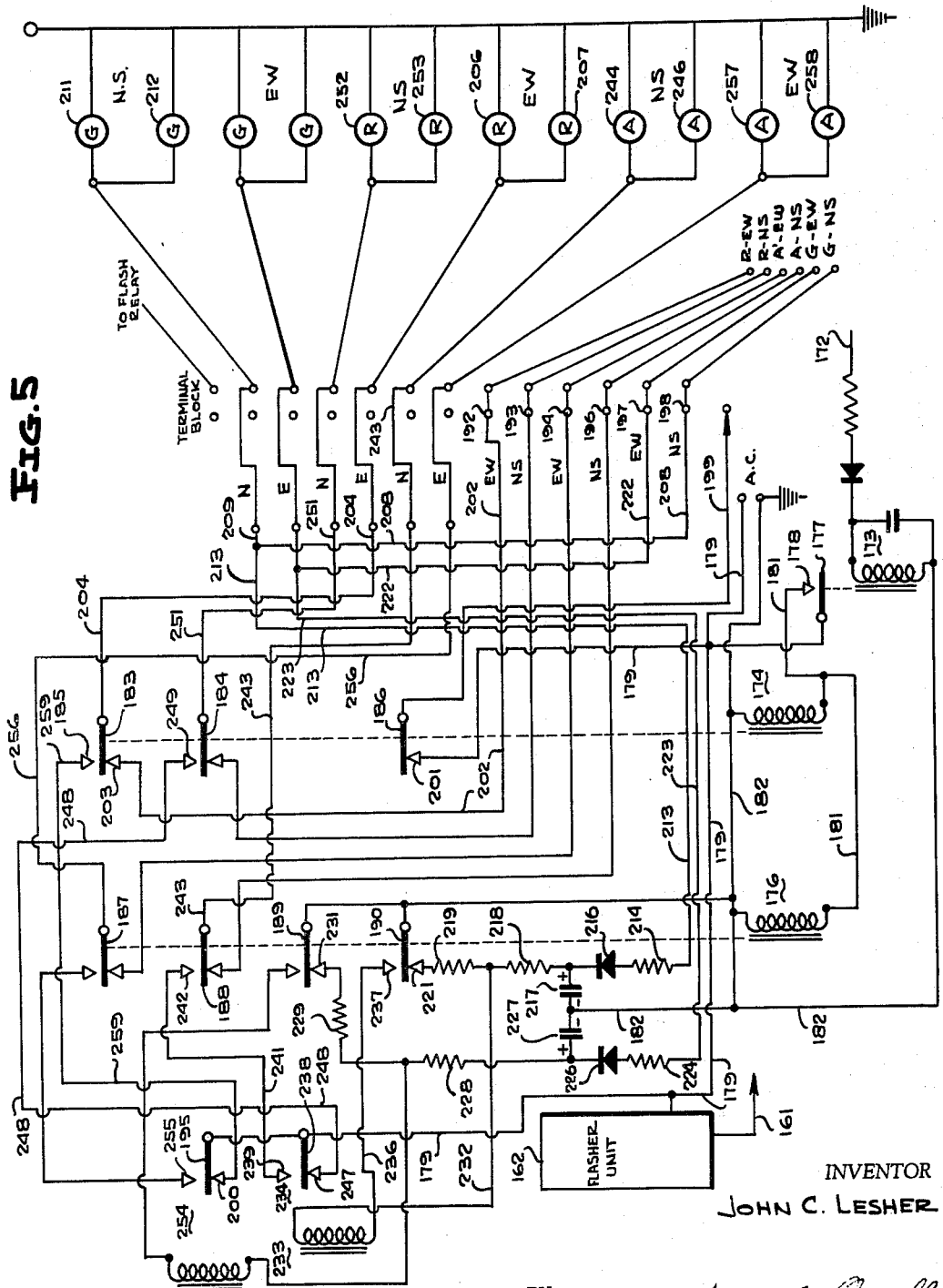
Figure 6:
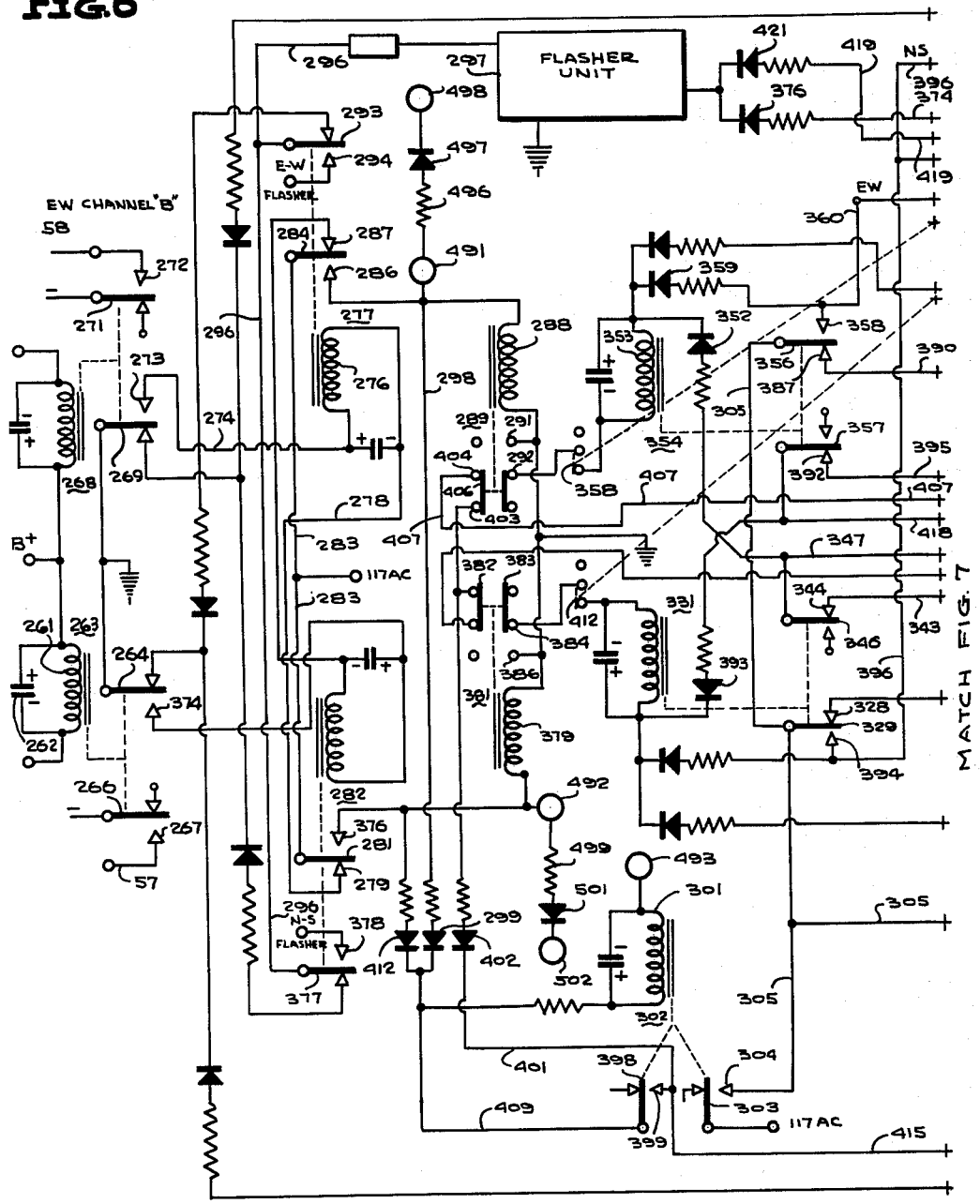
Figure 7:
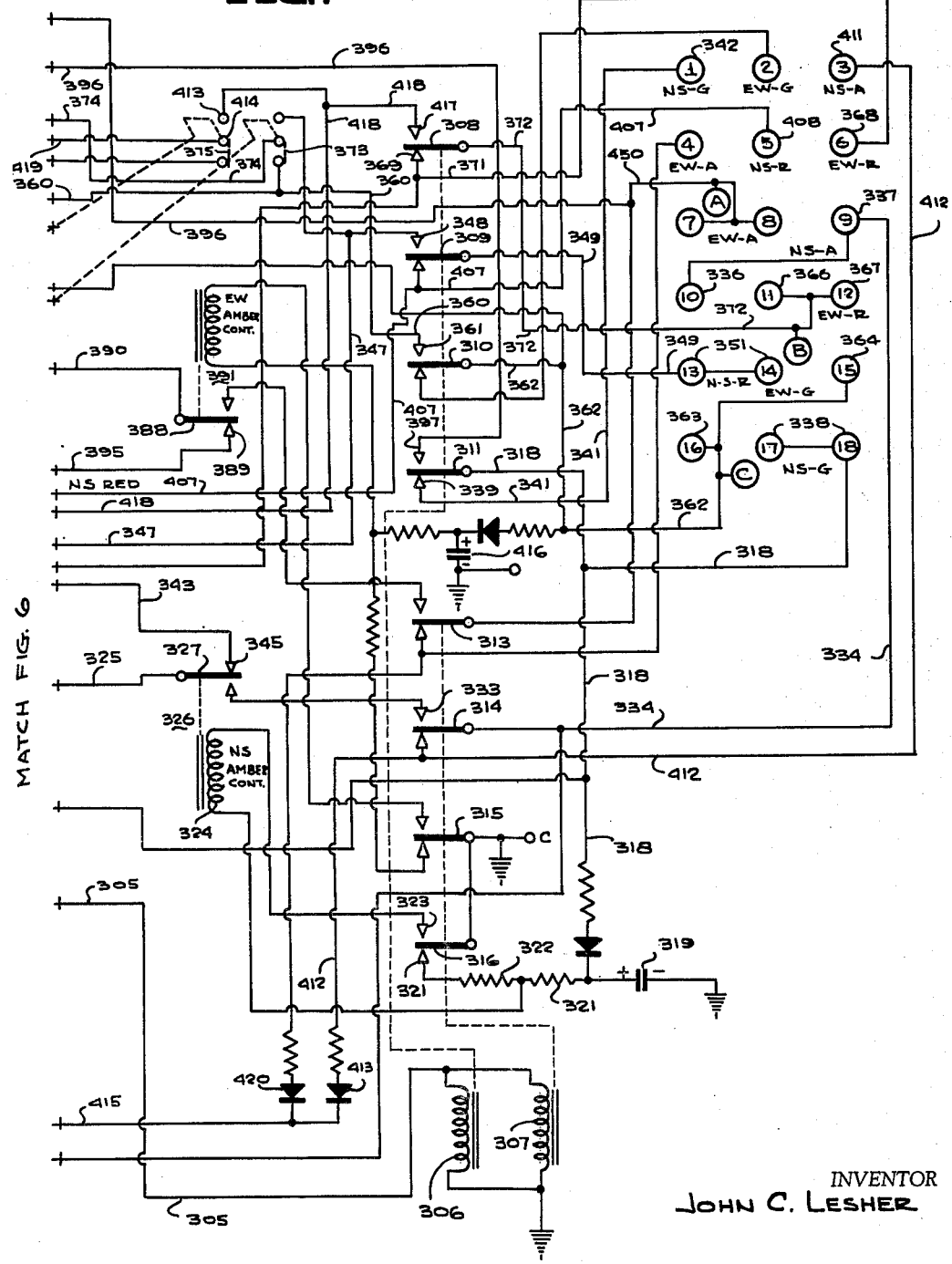
Figure 8:
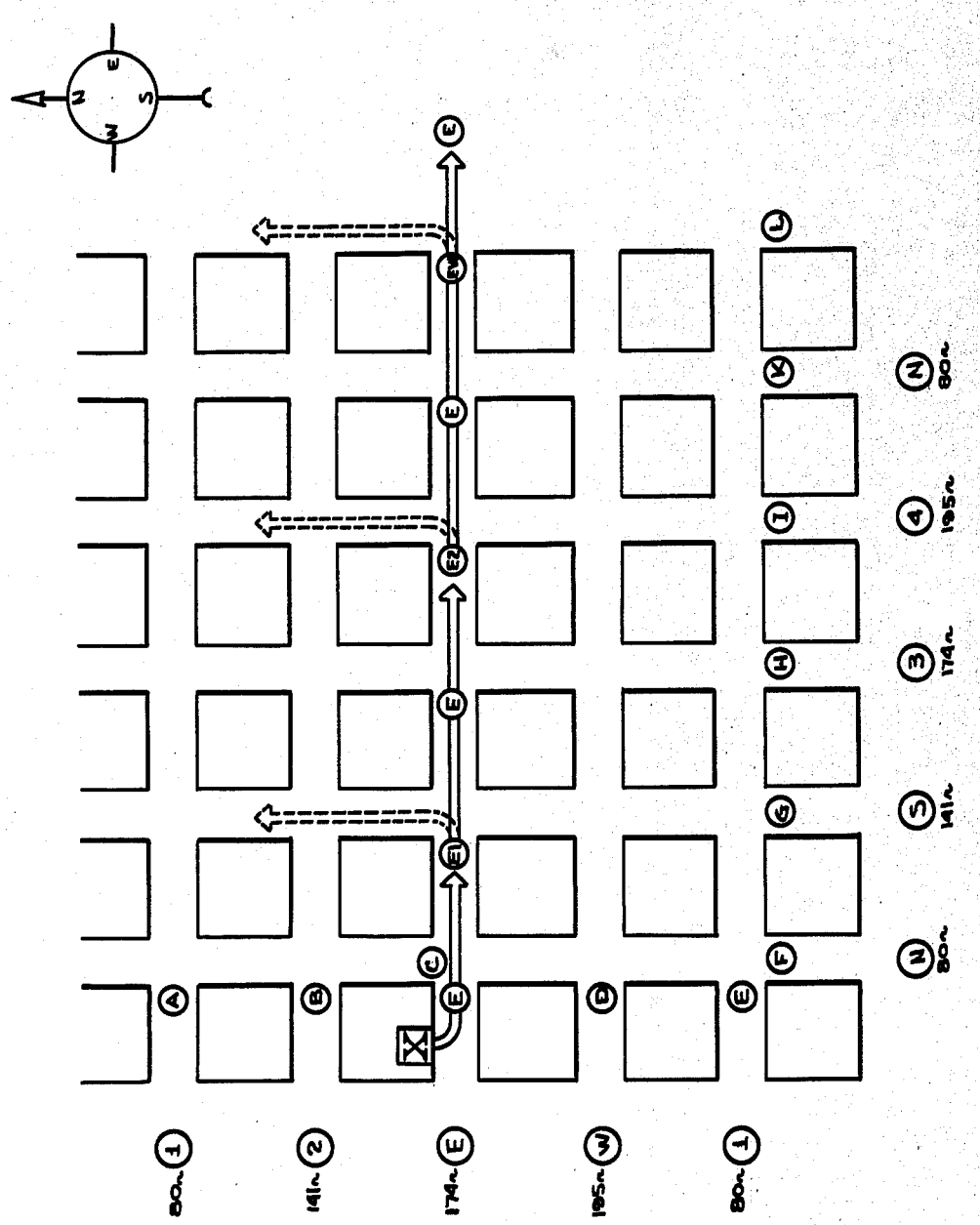
Figure 9:
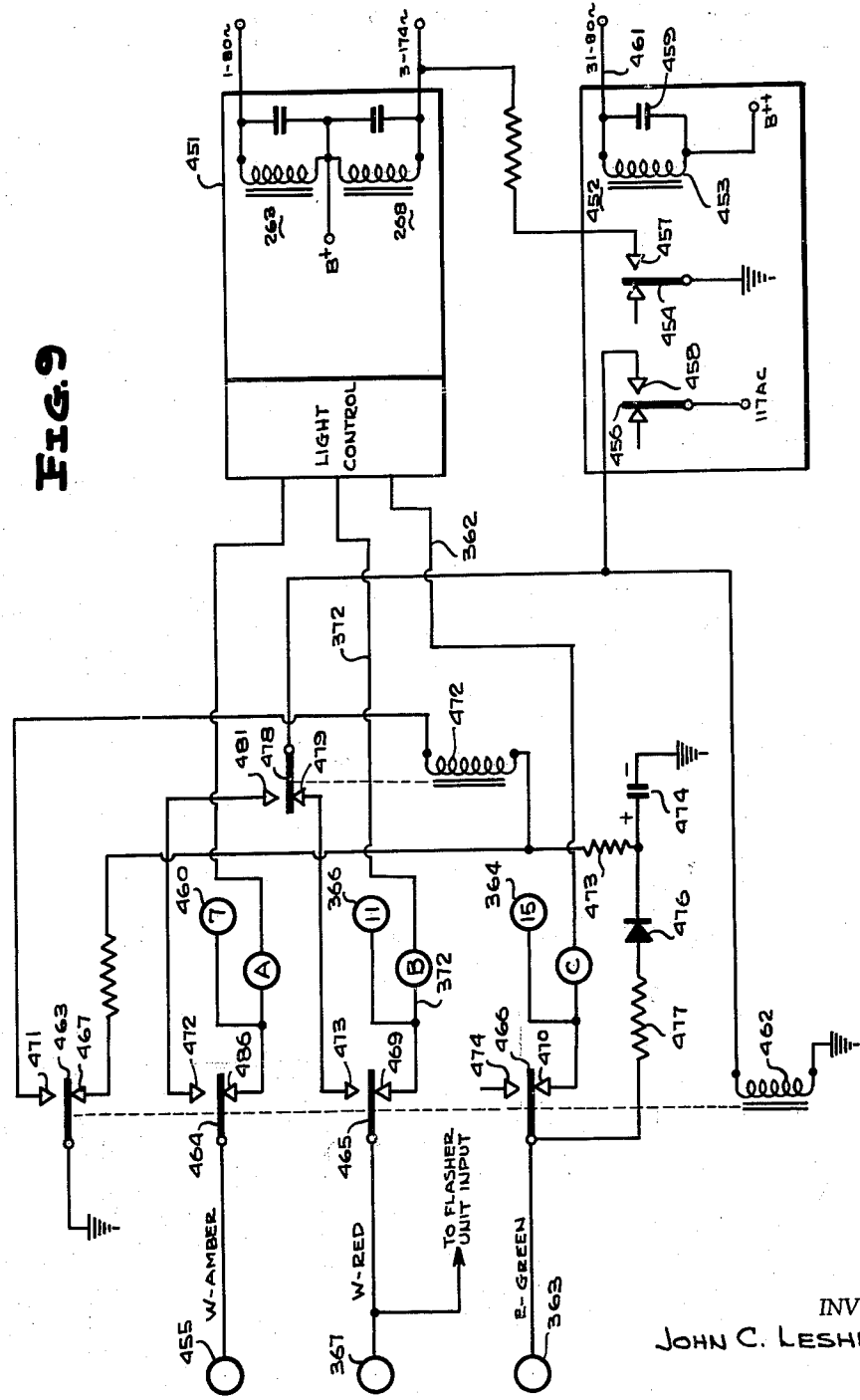
Figure 10:
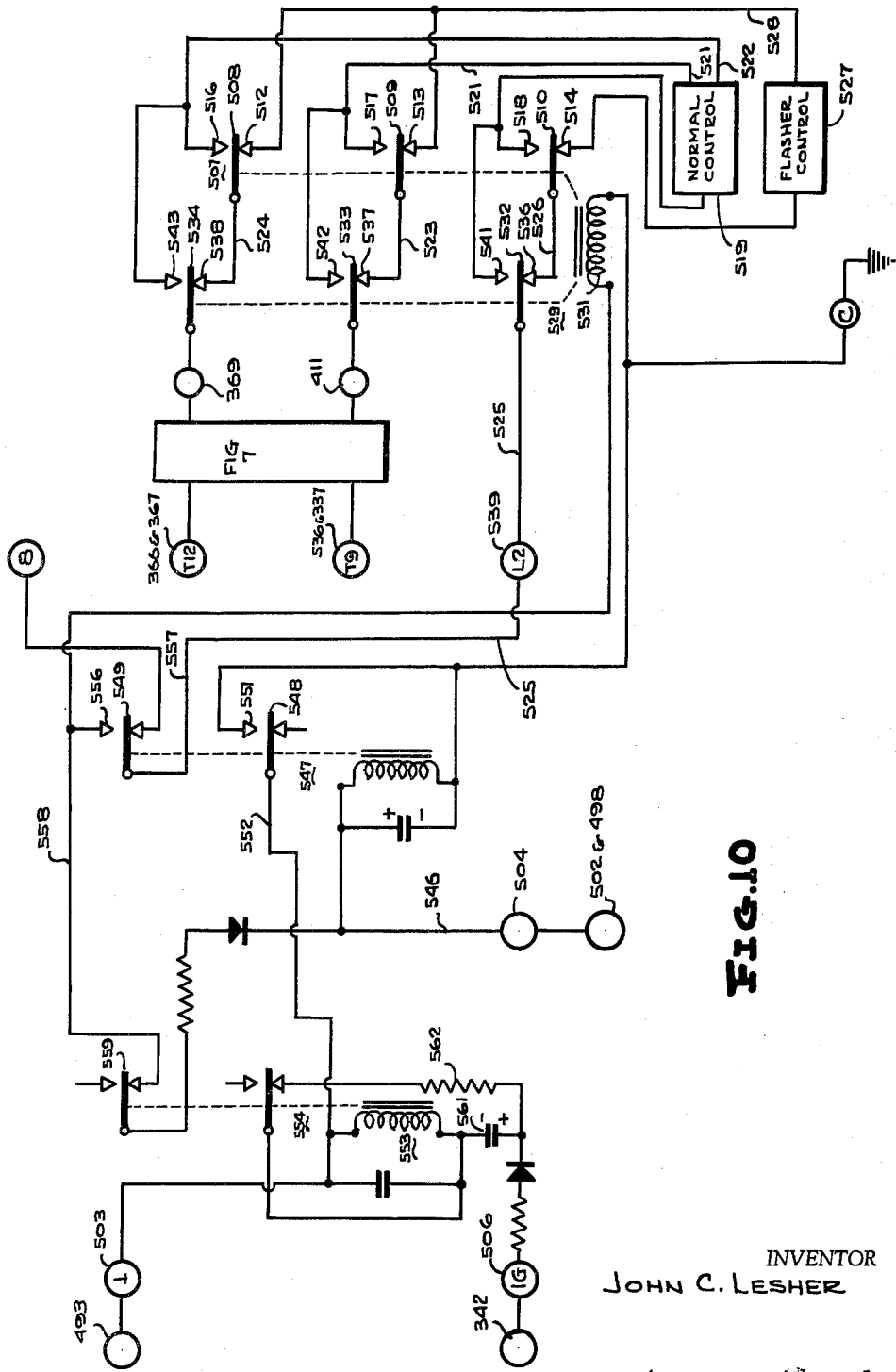
Figure 11:
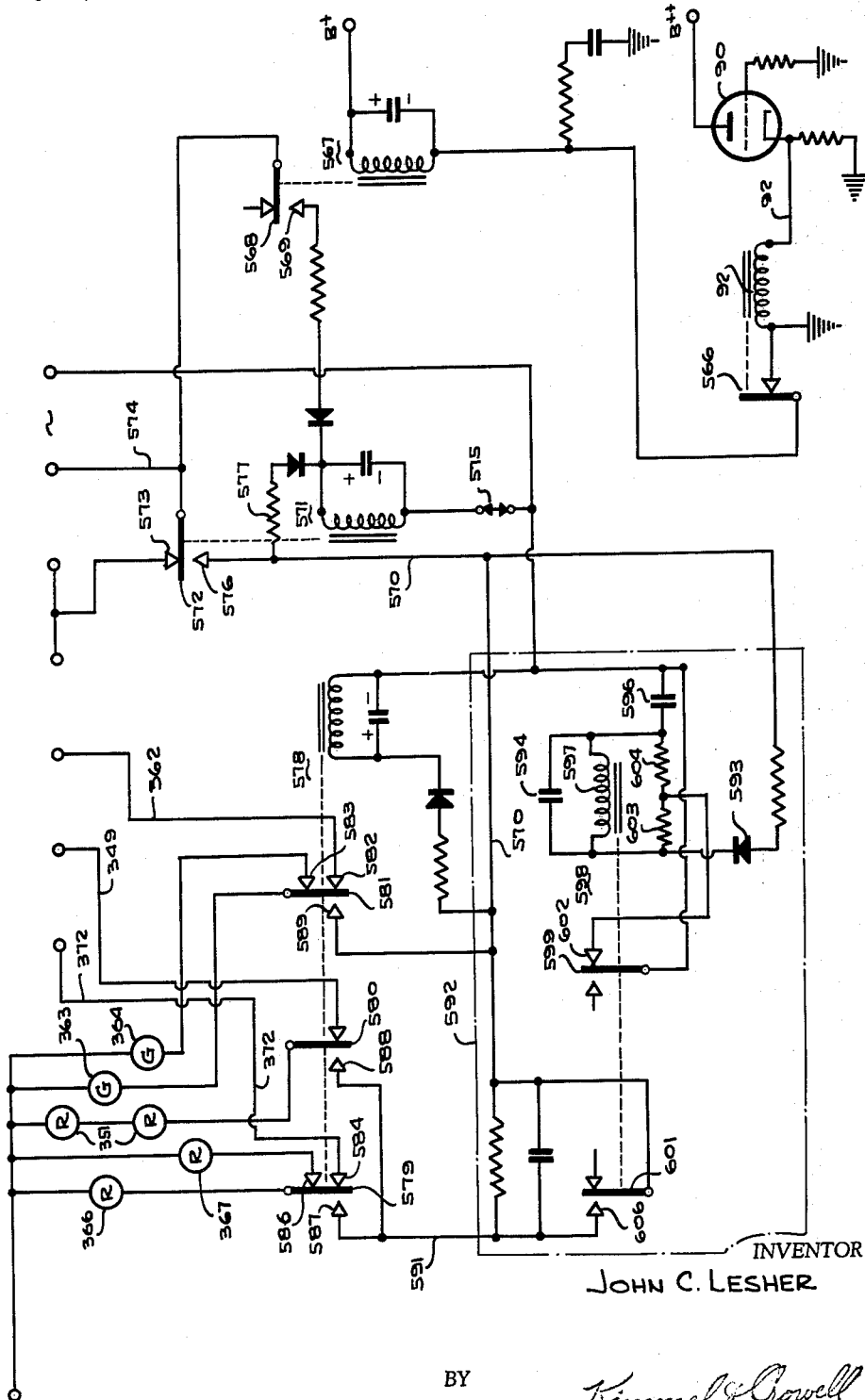

FIGURE 4 of the accompanying drawings is an electrical circuit diagram of the control signal responsive circuits and the flasher control circuits of the apparatus of the present invention;

FIGURE 5 of the accompanying drawings is an electrical circuit diagram of the apparatus responsive to the circuits of FIGURE 4 which remove the traffic light signals from the control of the conventional controller and place the signals under the control of the apparatus of the present invention;

FIGURES 6 and 7 taken together constitute an electrical circuit diagram of a preferred embodiment of the apparatus adapted to be connected to the output circuits of the channels of FIGURE 3 for operating the flasher warning lights and taking control of the lights away from the conventional controller and placing the lights under the control of the system of the invention;

FIGURE 8 is a diagram of a street layout employed in conjunction with the explanation of the circuit of FIGURE 9;

FIGURE 9 is an electrical circuit diagram which is adapted to be appropriately connected to the apparatus of FIGURES 6 and 7 and which is employed to permit safe left turns of emergency vehicles when the system of FIGURES 6 and 7 is adapted to provide green lights in both directions along the street of travel of the emergency vehicle;

FIGURE 10 of the accompanying drawings is a schematic circuit diagram illustrating the apparatus necessary for obtaining control over a traffic light system when it is providing a blinking array during off-hours; and FIGURE 11 is a schematic diagram of the civilian defense control circuit of the present invention.

Figure 1:
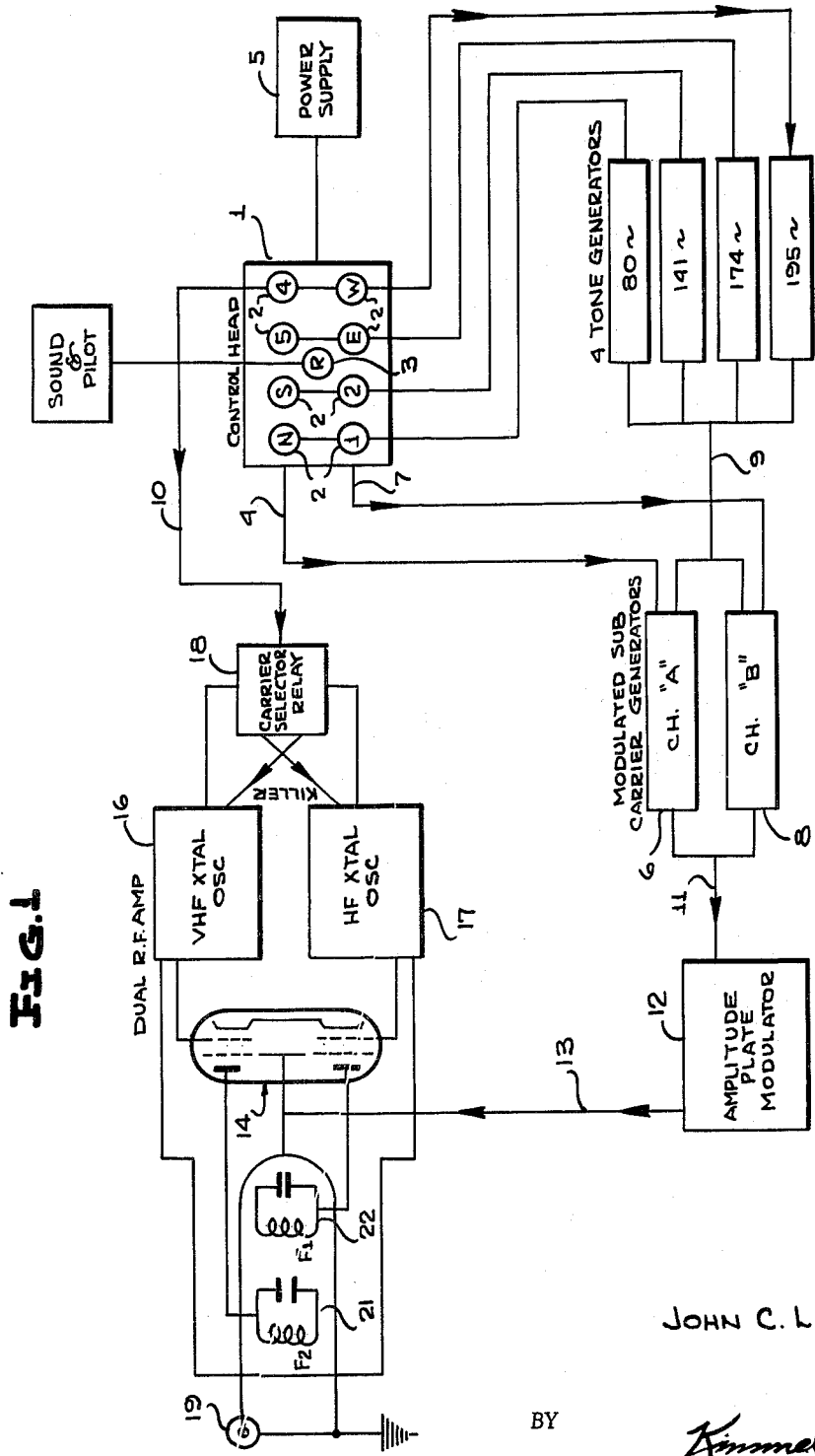

Referring specifically to FIGURE 1 of the accompanying drawings, there is illustrated a schematic block diagram of the control circuits for selectively transmitting various tones to a remote location at which the tones are to be detected and employed for control purposes. The tones may be employed in traffic light control which is the type of operation with which the present invention is particularly concerned and with the control of lighting in buildings to which emergency vehicles are proceeding. This latter type of operation is included along with the traffic light control system but is not discussed in detail since it forms the subject matter of co-pending patent application.

The transmitting apparatus comprises a control head 1 having, for instance, a plurality of eight push-buttons 2 for controlling selective generation of tones by the transmitting apparatus. The control head is also provided with a release push-button 3 adapted to release previously depressed push-buttons which are of the lock-down type. In the illustration of FIGURE 1, the push-buttons are arranged in two horizontal rows and four vertical columns. The upper row of push-buttons is labeled from left to right "N" for north, "S" for south, "3" and "4," while the push-buttons in a lower horizontal row are labeled from left to right "1," "2," "E" for east and "W" for west. The north, east, south and west buttons are employed to control a traffic light depending upon the direction from which the emergency vehicle is approaching the light while the buttons 1, 2, 3 and 4 serve further functions. Specifically, the button 1 may be employed for Civil Defense purposes in which case it is desirable to permanently set the lights along main arteries to green or blinking green which, once they are set by depressing this button, must thereafter be manually reset after the termination of the emergency. Alternatively, the buttons 1–4 may be employed to control traffic when making a left turn or along parallel or intersecting streets as desired. In other systems and specifically in the first system to be described, the button 4 may be employed to control lights internally of a building in which an emergency may have arisen and to which the emergency vehicles are proceeding.

The push-buttons in the upper horizontal row, when depressed, connect a lead 4 to an operating potential which, for purposes of explanation, is supplied by a power supply 5. The lead 4 is connected to a subcarrier modulator and generator generally designated by the reference numeral 6. Upon connection of the lead 4 to the supply 5, by depressing one of the push-buttons 2 in the upper horizontal row, continuity is established through the generator 6 and the generator produces a subcarrier signal which for purposes of explanation is chosen to be seven kilocycles per second. The push-buttons 2 in the lower horizontal row are adapted to connect a lead 7 to the source 5 and the lead 7 is connected to a subcarrier generator and modulator generally designated by the reference numeral 8. Upon connection of the lead 7 to the supply, the generator 8 is energized and produces a three kilocycle per second tone. In the subsequent description, the seven kilocycles per second and three kilocycles per second subcarriers are associated with channels A and B, respectively. The push-buttons 2 further serve to energize specific audio frequency tone generators. More particularly, the apparatus is provided with an eighty cycle tone generator, a one hundred forty-one cycle tone generator, a one hundred seventy-four cycle tone generator, and a one hundred ninety-five cycle per second tone generator. All of these tones are adapted to be connected via leads 9 to control electrodes of the generators 6 and 8. The audio frequency tones are generated in accordance with which push-button 2 of the control head 1 is depressed and more specifically, upon actuation of the push-buttons in the left vertical column, the eighty cycle per second audio frequency generator is energized and applies a tone at this frequency to the lead 9. If the north push-button is depressed then only the seven kilocycle per second generator 6 is operative and the eighty kilocycle per second tone modulates the seven kilocycle per second carrier. On the other hand, if the number 1 push-button is depressed, then the eighty cycle per second audio frequency tone modulates the three kilocycle per second generator 8 and a three kilocycle tone modulator with 80 kilocycle audio frequency tone is produced by the subcarrier generator section. The push-buttons labeled S and 2 are effective to produce energization of the 141 cycle per second generator, the push-buttons 3 and E energize the 174 cycle per second generator, while the push-buttons 4 and W energize the 195 cycle per second generator. It is seen that each vertical group of two push-buttons produce the same audio frequency tone but control energization of a different subcarrier generator. Thus, eight distinct combinations of subcarriers and audio frequency tones are possible.

The output voltage produced by the subcarriers generators 6 and 8 are applied via a common lead 11 to amplitude plate modulator 12 adapted to apply the modulated subcarrier tone via a lead 13 to a dual RF amplifier and modulator 14. The modulated subcarrier is applied to the screen grid of both sections of the dual RF amplifier while specific and different frequencies are applied to their control grids. The frequency employed for traffic light control is a very high frequency developed by a very high frequency, crystal controlled oscillator 16. If building control is to be effected, then the apparatus generates a high frequency carrier by means of a high frequency crystal controlled oscillator 17. Energization of one or the other carrier oscillators 16 and 17 is controlled by a carrier selector relay 18 which normally energizes the very high frequency crystal controlled oscillator 16. In the absence of a condition which disturbs this relationship, the modulated subcarrier signals applied to the lead 13 are broadcast via antenna circuit 19 as modulation on the very high frequency carrier generated by the oscillator 16. Each section of the dual RF amplifier is provided with a different tank circuit, specifically, tank circuits 21 and 22, each of which is tuned to its related crystal oscillator frequency. The only time that the carrier selector relay 18 is energized is when the push-button "4" is depressed to connect the relay 18 to the source 5 via lead 10 and the push-button. Upon the energization of the relay, operating bias is removed from the very high frequency crystal oscillator 16 and is applied to the high frequency crystal oscillator 17, so that the modulated carrier produced as a result of actuation of the push-button 4 is broadcast at a high frequency rather than at a very high frequency and therefore cannot be detected by the traffic light control circuits but is detected by the building control circuits.

Figure 2:
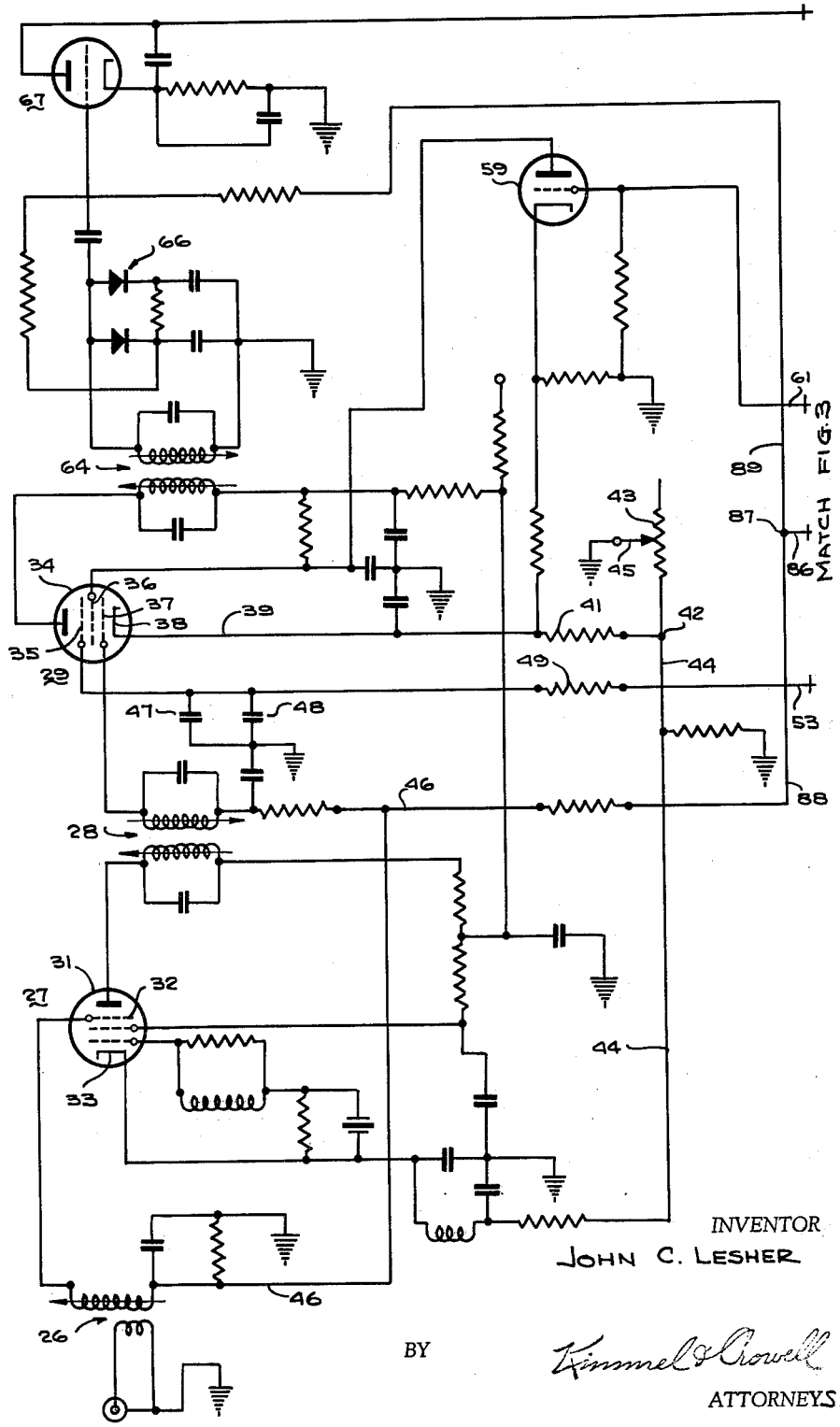
FIGURE 2 is an electrical circuit diagram of the receiver unit of the present invention.

Referring now specifically to FIGURES 2 and 3 of the accompanying drawings, which when arranged side-by-side, provide a complete schematic circuit diagram of the receiver and demodulator circuits of the present invention, a modulated carrier signal is intercepted by a suitable antenna and applied via an input transformer 26 to a first detector stage 27 which constitutes an RF amplifier, a carrier demodulator and a local oscillator. The demodulator stage 27 includes a pentode 31 having a suppressor grid 32 to which input signals are applied and a cathode 33. An IF signal is developed and is applied via an IF coupling transformer 28 to an intermediate frequency amplifier stage 29. The intermediate frequency amplifier 29 includes a vacuum tube 34 having a suppressor grid 35, a screen grid 36, a control grid 37 and a cathode 38. The cathode 38 is connected via a lead 39 and resistor 41 to a junction 42 with one end of a variable resistor 43 and a lead 44 connected thereto. The lead 44 is connected via appropriate coupling circuits to the cathode 33 of the tube 31. The variable resistor 43 has a variable tap 45 connected to ground. The position of the tap controls the bias on the cathodes 33 and 38 and is employed as a range control. The control grid 32 of the tube 31 is connected via the secondary winding of transformer 26 to a lead 46 which is also connected in the circuit of the control grid 37 of the tube 34. The coupling between the grid 32 and the grid 37 is employed to control the gain of the tube 31 when strong signals are received. Specifically, in the presence of heavy signals, grid rectification occurs in the tube 34 thereby developing a D.-C. voltage on the lead 46 which is proportional to the overdrive in the tube 34. This signal is a negative signal which tends to reduce the gain in the tube 31 and therefore reduce the overdrive of the system. Such an AGC control is required in systems employing mobile transmitters since the intensity or the energy of the incoming signal varies considerably from the most remote location at which the receiver first detects a signal and the condition which arises when the mobile transmitter is immediately adjacent the receiving antenna.

A fade delay circuit is connected in the circuit of a suppressor grid 35 of the tube 34. This circuit includes capacitors 47 and 48, resistor 49 and resistors 51 and 52. A voltage is injected into this circuit via a lead 53 extending between the junction of resistors 49 and 52 and the junction of resistors 54 and 56. The outer extremities of these latter resistors are connected respectively to negative killer bias leads 57 and 58 respectively for reasons which will become apparent subsequently. At any time during reception of a modulated carrier signal which takes over control of the traffic lights at a given intersection. One or the other of the leads 57 has a large negative potential applied thereto. A portion of this voltage is applied to the lead 53 and develops a potential across the storage capacitors 47 and 48 which is applied to the suppressor grid 35. In the event that a signal is picked up at the transmitter at the fringe of reception of the receiver, the possibility arises that the signal will fade temporarily due to movement of the transmitter toward the receiver. In this case, a vehicle may lose control of the light to another vehicle or the light may simply go back to its normal cycle temporarily. Two distinct circuits are employed to prevent this and the circuit comprising the fade delay circuit, including capacitors 47 and 48, is one of these circuits. Whenever a signal is initially detected, the voltage applied to the suppressor grid via lead 53 is stored in capacitors 47 and 48, increases the gain of the system, and therefore tends to overcome the effects of fading.

A second circuit for preventing undesirable effects due to fading is provided by a circuit associated with a triode 59. The negative killer leads 57 and 58 are connected to a lead 61 through balanced resistors 62 and 63, respectively. The tube 59 is normally conducting and has its cathode returned to ground via the resistor 41 in the circuit of cathode 38 of the IF amplifier tube 34. Upon the application of the negative killer bias to either of the leads 57 and 58, which as indicated above, occurs only upon the receiver obtaining control over the traffic lights at the intersection, a large negative bias is applied to the tube 59 and renders this tube non-conductive. In consequence, the voltage at the cathode 38 is reduced and effectively reduces the negative bias on the control grid 37. Thus, the gain of the system is enhanced. It will be noted that both of these controls over fading are associated with the IF amplifier stage 29 in that the voltage on both the cathode 38 and suppressor grid 35 of the tube 34 are modified as a result of the generation of the negative killer bias on leads 57 and 58 to increase the gain of the tube and negate the effects of fading due to relative movement between the transmitter and the receiver. As previously indicated, the initial range of the instrument is determined by the variable resistor 45 since this resistor determines the initial bias on the cathodes 33 and 38 and therefore the overall gain and sensitivity of the system to an incoming signal.

The output signals developed by the IF amplifier stage 29 are coupled via a transformer 64 to a noise limiter 66. The IF signal after processing by the noise limiter circuit 66 is coupled to a final IF stage 67 having series connected anode loads consisting of primary windings 68 and 69 of output transformers 71 and 72, respectively. The transformer 71 constitutes an input transformer to a channel "A" circuit while the transformer 72 provides input signals to a channel "B" circuit. The transformer 71 has a secondary winding 73 tuned to the seven kilocycle signal associated with channel A by means of a capacitor 74. The tuned circuit is connected to a grid 76 of a tube 77 acting as a plate detector so that the output signal produced in the anode circuit of the tube 77 constitutes the modulated seven kilocycle tone and the IF frequency has been eliminated. The output signal from the tube 77 is coupled through a transformer 78 having a secondary circuit tuned to the seven kilocycle tone. The secondary circuit further includes a detector 79 in conjunction with a filter circuit generally designated by reference numeral 81 which rectifies the signal and integrates the seven kilocycle carrier so that the original audio frequency modulating tone appears at a grid 82 of an audio frequency amplifier tube 83. As previously indicated, the seven kilocycle tone is rectified and filtered by the elements 79 and 81, and this voltage is applied via leads 84 and 86 to a junction 87 of two leads 88 and 89. The leads 88 and 89 are connected in circuit with the control grids of the IF amplifiers 34 and 67 respectively. Consequently, the gain of the system is controlled by the energy content of the seven kilocycle carrier in order to insure that sufficient subcarrier energy, and in consequence, audio frequency energy is applied to the individual channels to permit operation of subsequent circuitry.

The audio frequency signals applied to the tube 83 are developed as anode voltages and are capacitively coupled to a cathode follower amplifier 85 which is employed to drive frequency detecting vibrator reed circuits in a latter part of the equipment. These output signals appear on a lead 91.

Channel "B," which is fed signals through the input transformer 72, is substantially identical with the circuit of channel A except that the input and inter-stage coupling transformer between the first and second tubes in the stage are tuned to three kilocycles per second rather than seven kilocycles as is the upper channel A. Output signals from this apparatus appears on an output lead 92 connected in the cathode circuit of an amplifier tube 90.

It should be noted, and referring now to FIGURES 1, 2 and 3, that the channel A of both the transmitter and receiver are tuned to a seven kilocycle operating subcarrier while channel B is tuned to a three kilocycle subcarrier frequency. Depending upon which of the buttons of the control head 1 are pushed, any one of the four distinct tones may appear in the channel B while only the three lower tones appear in the channel A since the tone 195 associated with the channel A is broadcast on a high frequency carrier rather than a very high frequency carrier and therefore cannot be received by the receiver. The system of FIGURES 2 and 3 is gain stabilized for both carrier and subcarrier energy content and further has its gain increased once a killer bias is developed in order to prevent on-off operation in response to fading of the transmitted signal when transmitting from the outer limits of the range of the receiver.

As previously indicated, the negative voltages alternatively developed on the leads 57 and 58 are employed to boost the gain of the system upon operation of subsequent traffic light control circuits. The primary function of the voltages developed on these leads, however, are to alternatively bias the channel A or B to a nonamplifying state, when a signal is received to which the opposite channel is tuned. Specifically, if the channel A receives a signal and develops an output audio frequency signal on the lead 91 upon the system obtaining control of the north-south lights, a voltage is developed on the lead 57 which is applied to the grid of the first tube of channel B via a lead 93 and this tube is negatively biased to cut off. In consequence, if for any reason a vehicle approaching from an east or west direction attempts to obtain control of the system, the channel which is responsive to signals of this frequency; that is, the three kilocycle subcarrier is inoperative and these signals cannot compete with the signals proceeding through channel A for control of the system. Similarly, if a channel B signal; that is, a three kilocycle subcarrier modulated with an appropriate tone is received first, then a large negative voltage is developed on the lead 58 and is applied via a lead 94 to the grid 76 of the tube 77 and renders this tube non-conductive. In consequence, if an east-west control signal is initially received, the north-south channel A is rendered inoperative so that a vehicle approaching from the north or south cannot compete for control of the system with the vehicle producing signals proceeding through the channel B. The method of generating the killer biases will be described subsequently. However, it should be pointed out that the signals received on the leads 57 and 58 are intermittent; that is, are pulsed signals of a large amplitude. These signals are applied to storage capacitors 96 and 97, respectively, which effectively smooth the voltage and develop the large amplitude constant voltage required to provide the killer function for the channels A and B and further to provide the fringe boost voltage for control of the triode 59.

Referring specifically to FIGURE 4 of the accompanying drawings, there is illustrated one embodiment of the circuits employed to obtain control over traffic light systems upon the detection of appropriate audio frequency tones by the receiver and demodulating circuits of FIGURES 2 and 3. In the circuit of FIGURE 4, only two tones per channel are employed. Referring specifically to FIGURE 4, a lead 91 from the output circuit of the cathode follower amplifier tube 84 is connected to ground through a reed drive coil 98. The lead 92 from the cathode follower output stage of the channel B amplifier is connected to ground through a reed coil 99. The reed coil 98 is positioned relative to an eighty cycle reed 101 and a one hundred forty-one cycle reed 102 to selectively produce vibration of these reeds upon receipt of an appropriate tone. Similarly, the coil 99 is arranged with respect to a one hundred seventy-four cycle reed 103 and a one hundred ninety-five cycle reed 104 such that the appropriate reed is vibrated upon receipt of the tone to which the reed is tuned. Vibration of the reeds 101 to 104 produces selective engagement between each reed and associated contacts 106, 107, 108 and 109 respectively. The contact 106 is connected through a circuit 111 tuned to an 80 cycle per second tone and constituting a coil 112 of a north relay 113 further comprising an armature 114. The end of the coil 112 remote from the contact 106 is connected to a stationary contact 116 associated with the armature 117 of a south relay 118 having a coil 119. The coil 119 has one end connected to the contact 107 and the other end connected to a contact 121 associated with the armature 114 of the north relay 113. The armature 114 is connected via a lead 122 to a source generally designated by reference numeral 123 of positive voltage. The contact 117 is connected via a lead 124 to a source of negative voltage generally designated by the reference numeral 126. The vibrating reeds 101 to 104 are normally connected to ground so that if one of the reeds; for instance, the reed 101, is set into vibration and intermittently contacts the contact 106, current flows through a circuit comprising the negative supply 126, armature 117, contact 116, coil 112, contact 106, reed 101 and ground. Energization of the relay 113 causes its armature 114 to disengage the contact 121 and engage a contact 127. In consequence, the circuit from the south relay coil 118 through the armature 114 to the positive supply 122 is broken, and therefore, when initially the north relay is energized, the south relay cannot be energized. Similarly, if the south relay is first energized, the armature 117 becomes disengaged from the contact 116 and engages a contact 128. Upon disengagement of the armature 117 from the contact 116, the circuit from the negative supply 126 to the coil 112 is interrupted and thus when the south relay 118 is energized, the north relay 113 cannot be. This condition is useful when a single green light is to be employed in the direction in which the emergency vehicle is proceeding. Since both north and south tones are placed upon the same seven kilocycle subcarrier, the killer bias applied to the channel B does not prevent both north and south control signals from proceeding through the receiver demodulator circuits of FIGURES 2 and 3 to the control circuits of FIGURE 4. In order to prevent a latter received signal from competing for control of the system with a previously received signal, the above described inter-connection of the north and south relay energization circuits is employed and energization of one of these relays positively prevents energization of the other of the relays.

A similar arrangement is employed with respect to east and west relays 131 and 132, respectively, so that in this respect the systems are completely symmetrical.

Upon energization of the positive relay 113, contact 114 engages the stationary contact 127 to apply a positive potential to a lead 133. Alternatively, energization of the south relay 118 causes the armature 117 to engage contact 128 and applies a negative potential also to the lead 133. The voltage appearing on the lead 133 is coupled through an appropriate resistor 134 to a non-polarized relay arrangement generally designated by the reference numeral 136. The relay controls two movable armatures or contacts 137 and 138 associated with stationary contact 139 and stationary contacts 141 and 142, respectively. The contact 137 is normally out of engagement with the stationary contact 139 while the contact 138 is normally in engagement with the stationary contact 141 and may be switched to engagement with the contact 142 when the relay 136 is energized. Being a non-polarized relay, the relay 136 switches the contacts 137 and 138 from the position indicated in the drawing into engagement with the contacts 139 and 142 respectively, whenever a voltage, whether positive or negative is developed on the lead 133. The contacts 137 and 138 are connected together and are connected to a source of reference potential such as ground. The stationary contact 139 is connected via a lead 143 to a coil 144 of a control relay 146. The other end of the coil 144 is connected to a high voltage side of an A.C. supply. The contact 142 is connected via a lead 147 to one end of a coil 148 of a polarized relay 149 having a movable contact 151 and stationary contacts 152 and 153. The other end of the coil 148 is connected via a diode 154 in series with a resistor 156 to the lead 133. The stationary contacts 152 and 153 are connected to south and north blinker lights 154 and 156 respectively.

In operation, upon energization of the relay 136, the lower end as viewed in FIGURE 4 of the coil 148 is connected to ground via contacts 142 and 138. If a positive signal is applied to the lead 133; that is, if the north relay 113 is energized, the diode 154 blocks the flow of current through the coil 158 and the coil remains de-energized. Consequently, the movable contact 151 of the relay 149 remains de-energized and the contact 151 remains in a position to energize the north blinker light 156. The contact 151 is adapted to have a pulsating voltage applied thereto whenever either the north or south relays 113 and 118 are energized. This is accomplished as a result of the fact that, when the relay 136 is energized, the armature 137 engages the movable contact 139 and a circuit through the coil 144 is completed. This coil causes associated armature 157 to engage a stationary contact 158 which is connected via a lead 159 to the armature 151 of the relay 149. The movable armature 157 of the relay 146 is connected via lead 161 to a flasher unit 162 which, as will be described subsequently, is adapted to generate a pulsating voltage on the lead 161 whenever a control signal is developed or whenever the apparatus responds to an incoming traffic control signal.

Assuming the situation when a south control signal is received, a negative voltage appears on the lead 133 and energizes the relay 136. This voltage is not blocked by the diode 154 and, in consequence, current flows through the diode 154 and through the coil 148 of relay 149 causing energization of the relay. Energization of the coil 148 causes the armature 151 to engage the stationary contact 152 and the pulsating voltage applied to the lead 159 is now applied to the south blinking light 154. Thus, one or the other of the lights is caused to be energized depending upon which of the relays, the north relay 113 or the south relay 118 is energized by the incoming signals applied to the reed drive coil 98. It should be also noted that the killer bias applied to the lead 57 is derived from the lead 159. It will be remembered that this voltage is applied to the B channel to block this channel whenever information is applied to the north-south channel A.

A further safety feature is built into this section of the apparatus and prevents one of the channels from becoming operative when the other channel is initially energized. Note that the stationary contact 141 associated with the armature 138 is connected via a lead 163 to a relay 136′ associated with the channel B and which corresponds to the relay 136 of the channel A. It will be noted that if the relay 136 is energized, the stationary contact 141 is disconnected from ground and therefore the circuit through the coil of the relay 136′ is broken. In consequence, if for some reason, a voltage were applied to the coil 136′, the relay would not be energized if the coil of relay 136 were already energized. This feature is applied to both channels and it will be noted that coil of the relay 136 is connected via a lead 164 to a stationary contact 141′ of the relay 136′ so that when the relay 136′ is energized, the circuit through the coil of the relay 136 of north-south channel A is broken and this coil cannot be energized if the corresponding relay of the opposite channel is energized.

The relay 136 has associated therewith a rectifier and capacitor storage circuit generally designated by the reference numeral 166. This arrangement provides a predetermined delay in the actuation of the relay 136 of, for instance, one-half second and a predetermined delay in drop-out of the relay after termination of the applied voltage which, for instance, may be three seconds. The initial short delay in pick-up of the coil is employed to prevent the apparatus operating upon a sudden transient which may contain an unfortunate combination of the proper frequency components. On the other hand, the time delay in drop-out of the relay 136 is employed to hold the traffic light under control of the apparatus of the invention even after a vehicle has passed the intersection. This arrangement is employed primarily to take care of the common occurrence in which a series of emergency vehicles are proceeding in the same direction along the same street. A certain time lapse may exist between the time in which each vehicle passes a predetermined location and it is intended by the time delay introduced in the circuit 166 to prevent the light controls from returning to normal operation during this short interval. Obviously, the very short return of the light circuit to the regular control and then the immediate acquisition of control by a second emergency vehicle would only serve to seriously confuse the motorists at the intersection and perhaps cause a serious accident. Circuits corresponding to the circuits 166 are associated with the relay 136′ and, in fact, the entire operation of the channel B is identical in every respect with channel A except, of course, that they respond to different audio frequencies applied to the different coils 98 and 99.

As previously indicated, the relay 146 controls the application of the flasher voltage to the lead 159 by means of the movable contact 157 and the stationary contact 158. The relay 146 has a further movable contact 167 and two stationary contacts 168 and 169 adapted to be alternatively engaged by the movable contact 167. Contact 167 is connected via a lead 171 to contact 167′ associated with relay 146′. The contact 167′ normally engages contact 169′ and the contacts 169 and 169′ are both connected to a high voltage or ungrounded terminal of a conventional alternating current supply. Upon energization of the coil of the relay 146, the movable contact 167 engages stationary contact 168 and thereby connects an alternating voltage via a lead 172 to a time delay circuit 173. This circuit is employed to increase the holding time provided by the circuit associated with the coil 136 by an additional four seconds so that a total of seven seconds delay may be provided in the event such an extended delay is required. This extended delay may be required at lights controlling intersections on the open highway where high speeds are involved and therefore additional delays are required to insure safety. After the predetermined delay introduced by the unit 173, relay coils 174 and 176 are energized and, in so doing, assume control of the traffic lights in the manner to be described with respect to FIGURE 5 of the accompanying drawings.

Referring now specifically to FIGURE 5 of the accompanying drawings, the lead 172, which applies the signal to the delay relay 173, is illustrated in FIGURE 5 as is the relay. Upon energization of the relay 173, an armature 177 associated therewith is caused to engage a stationary contact 178. The armature 177 is connected to a high voltage bus 179 and therefore when the contacts of relay 173 are closed, voltage is applied via the stationary contact 178 to the lead 181. The coils of the relays 174 and 176 are connected between the lead 181 and a common or grounded bus 182. Consequently, the relays 174 and 176 are energized. The relay 174 has associated therewith three movable contacts 183, 184 and 186, while the relay 186 has four movable contacts associated therewith, 187, 188, 189 and 190.

In order to explain the operation of the apparatus of FIGURE 5, an example is initially assumed wherein, prior to an emergency condition arising, the east-west signals are red and the north-south signals are green. The electrical energy for illuminating the various signal lights is applied from a standard controller alternatively to an east-west red terminal 192, a north-south red terminal 193, an east-west yellow terminal 194, a north-south yellow terminal 196, an east-west green terminal 197 and a north-south green terminal 198 The operating voltage for the controller and the voltage routed by the controller to the terminals 192 to 198 is derived from the circuit of FIGURE 5 on a lead 199 which receives high voltage from the high voltage bus 179 via the movable contact 186 of the relay 174 and its associated stationary contact 201.

It is assumed that a lighting voltage is applied to the east-west red terminal 192 and to the north-south green terminal 198. The terminal 192 is connected via a lead 202 to a stationary contact 203 associated with the movable contact 183 of the relay 174. The movable contact 183 is connected via a lead 204 to east-west red signal lights 206 and 207. The north-south green terminal 198 is connected via a lead 208 to a lead 209 connected to supply voltage to the north-south green lights 211 and 212, respectively. Thus, under normal conditions when the relays 174 and 176 are not energized, voltage is applied to appropriate circuits of the apparatus of the present invention to produce normal operation of the various signal lights at the particular corner under consideration.

It will be noted that the north-south green lead 208 is connected also to a lead 213 which is connected through a resistor 214 to a diode 216 which rectifies the A.-C. voltage and charges a capacitor 127 to a positive voltage with respect to ground. The junction of the capacitor 217 and the diode 216 is connected through series connected resistors 218 and 219 to a stationary contact 221 associated with the movable contact 190 of the relay 176. When the north-south green voltage is applied to lead 208 via terminal 198, the capacitor 117 is charged positively with respect to ground and, when a voltage is subsequently removed during normal cycling from the terminal 198, the capacitor 217 discharges relatively rapidly through resistors 218 and 219 to the ground bus 182 via contacts 190 and 221. The east-west green terminal 197 is similarly connected via a lead 222 to a lead 223 and connected through a resistor 224 to a diode 226. The diode rectifies the A.-C. voltage and charges the capacitor 227 positively with respect to ground. The junction of diode 226 and capacitor 227 is connected through series connected resistors 228 and 229 to a stationary terminal 231 associated with the movable contact 189 of the relay 176. Thus, if the east-west signals are green rather than the north-south signals, the capacitor 227 is charged positively, and in normal cycling when the high voltage is removed from the lead 223, the capacitor discharges to ground through resistors 228 and 229.

Proceeding with the description of the opeartion of the system, upon energization of the relays 174 and 176, initially the contacts 183, 184 and 186 and 187, 188, 189 and 190 are moved to engage their upper contacts. In the example assumed for purposes of description, the east-west lights are red, the north-south lights are green and, consequently, the capacitar 217 is charged to a positive voltage and maintains this voltage for a predetermined length of time. The junction of the resistors 218 and 219 is connected via a lead 232 to one end of a coil 233 of a relay 234. The other end of the coil 233 is connected via a lead 236 to an upper contact 237 associated with the movable contact 190 of the relay 176 which is connected to ground. Thus, an energizing circuit is completed through the relay 234 and its armature 238 engages an upper stationary contact 239. The movable contact 238 is connected to the high voltage bus 179 and applies a high voltage alternating voltage via the contact 239 to a lead 241 connected to an upper stationary contact 242 associated with the movable armature 188 of the relay 176. Since the relay 176 is energized, the armature 188 engages the stationary contact 242 and an alternating current voltage is applied to a lead 243. The lead 243 is connected to north-south amber lights 244 and 246 respectively, and these lights are energized for a predetermined time determined by the time constants of the circuit including the capacitor 217. It will be noted that, upon energization of the relay 174, the movable contact 186 disengages its stationary contact 201 and the A.-C. voltage is removed from the lead 199 and the motor and lighting circuits of the light controller are de-energized. The east-west red signals are maintained energized by being connected to the high voltage bus 179 via contacts 183 and 185 of the relay 174 and a lead 259 connected to bus 179 through contacts 195 and 200 of relay 254. After a predetermined length of time determined by the time constant of the capacitor 217 and its associated circuits, the relay 233 is de-energized and the movable contact 238 engages the stationary contact 247. This contact is connected via a lead 248 to a stationary contact 249 associated with movable contact 184 of the relay 174. The movable contact 184 is connected via a lead 251 to north-south red signal lights 252 and 253. Thus, after the length of time determined by the aforesaid timing circuit, the north-south amber signals are discontinued and the north-south red signals are illuminated.

The operation of the system is substantially identical if initially the north-south signals had been red and the east-west signals had been green. Under these conditions, the capacitor 227 would have been charged and would have produced energization of the relay 254 which would control the application of alternating high voltage initially through its contacts 195 and 255 to the movable contact 187 of the relay 176 and thence via a lead 256 to east-west amber signals 257 and 258. After the relay 254 had timed out, high voltage is applied via contact 200 and a lead 259 to the movable contact 183 of the relay 174 and thence via lead 204 to the east-west red signals 206 and 207, respectively. The north-south red signal is maintained energized via contacts 184, 249, lead 248 and contacts 238 and 248 of relay 234 to lead 179.

After the emergency vehicle has passed the intersection, the various relays time out and voltage is again applied to lead 199 so that the conventional controller assumes control over the lights.

As seen from the above description relative to FIGURES 1 through 5, upon the actuation of one of the pushbuttons 2 of the transmitter, a predetermined subcarrier having a predetermined tone applied thereto is transmitted via a particular carrier signal to a receiving apparatus. The receiver detects the carrier, and then the subcarrier, and then the audio frequency signal tone to produce an audio frequency signal in response to which the apparatus of the invention effectively takes over control of the lights at an intersection and produces a red signal in four directions after providing an appropriate amber signal for the direction in which traffic had previously been moving. It will also be noted that a number of interlocking circuits are provided so that response to different signals concurrently is not possible. In the system described with respect to FIGURES 4 and 5, two channels are not required to obtain control of the signal lights themselves since the particular channel through which the system receives its initial control signal is immaterial. However, the lock-out circuits and the determination of which of the blinker lights; north, south, east or west, is to be operated in order to produce an indication of which vehicle has control, require a two channel system. The basic purpose for providing the blinking signals is to prevent a collision between two emergency vehicles both of which assume that they have obtained control over the light at the intersection. Thus, for instance, if two emergency vehicles are approaching the same corner from east and north, in the system of FIGURES 4 and 5 in which red signals are given in all four directions, it is quite possible that the drivers of both vehicles would assume that they had assumed control of the signal system at the corner and it was perfectly safe for them to proceed. However, such may not be the case and an accident could result. In the system of the present invention, the blinker light is energized for one direction only and it is only the vehicle which is approaching the blinker light that has actually assumed control of the lights and may proceed through the intersection on the assumption that this vehicle has obtained control of the light. Any vehicle approaching from any other direction does not have a blinker light actuated in his direction and is immediately informed thereby that another vehicle is approaching that corner and has control of the light.

The system of the invention is not limited to a specific pattern of lights at a given intersection and other patterns may be desirable. Specifically, patterns may be employed in which the street along the route of an emergency vehicle has green lights in both directions at all intersections so that normal traffic may move along the route of the emergency vehicle after the emergency vehicle has passed. A system is illustrated in FIGURES 6 and 7 of the accompanying drawings, which is capable of producing either all red signals at a given intersection or two reds and two greens operating perpendicular to one another. The apparatus of FIGURES 6 and 7 may employ tuned vibrating reeds as the apparatus of FIGURE 4. On the other hand, the apparatus may employ tuned relays, this being the type of system illustrated in FIGURES 6 and 7. In the event that tuned relays are employed, the relays are normally driven from the plate circuit of the output stage of the apparatus of FIGURE 3 rather than from the cathode circuit. Thus, the stage 84 of the FIGURE 3 would constitute, instead of a cathode follower, a plate loaded tube having a coil 261 tuned to the low frequency audio range by means of a capacitor 262. The coil 261 forms part of a relay 263 having movable armatures 264 and 266. The armature 266 has a large negative bias applied thereto and is adapted to engage a contact 267 connected to the killer bias lead 57 of FIGURES 2 and 3. Thus, upon energization of the relay 263, killer bias is applied to channel B of FIGURES 2 and 3.

Channel B of FIGURES 2 and 3 is adapted to energize a relay 258 having movable armatures 269 and 271. The armature 271 is adapted to engage a contact 272 upon energization of relay 268 and apply a killer bias to the lead 58 of FIGURES 2 and 3.

For purposes of explanation, assume that an emergency vehicle is approaching either from the east or west and, in consequence, the channel B circuit is energized. The movable contact 269 of the relay 268 engages a stationary contact 273 and the contact 271 engages contact 272, the latter set of contacts applying the killer bias to the lead 58. Contact 273 completes the circuit via a lead 274 through coil 276 of a relay 277. The end of the relay 276 remote from the lead 274 is connected via a lead 278 and contacts 279 and 281 of relay 282 to a high voltage lead 283. Energization of the relay 277 closes contacts 284 and 286 opening contacts 284 and 287. The opening of contacts 284 and 287 breaks the circuit through coil of the solenoid 282 so that once the east-west channel is energized, the north-south channel in which the relay 282 is disposed cannot be energized. This corresponds to the lock-out feature of FIGURE 4 of the accompanying drawings. The establishment of engagement between contacts 284 and 286 of the relay 277 applies a high voltage to a coil 288 of a relay 289 and causes a circuit to be completed between contacts 291 and 292 for purposes to become apparent subsequently. The energization of the relay 277 also closes its contacts 293 and 294 so as to energize an east-west flasher unit connected to the contact 294. It will be noted that the contact 293 is normally connected via a lead 296 to a flasher unit enclosed within the dashed-line box 297. Thus when the relay 277 and flasher unit 297 are energized an east-west flasher unit becomes operative.

The engagement between the contacts 284 and 286 in addition to energizing the relay 289, applies a high voltage to a lead 298 which is connected via a rectifier 299 to a coil 301 of a further relay 302. The relay 302 corresponds with the relay 136 of FIGURE 4 and provides a half second time delay in energization and a 3½ second time delay during de-energization so as to permit successive vehicles coming along this same street to maintain control over the light. Upon the relay 302 timing out on its pick up operation, it closes the associated contacts 303 and 304 to apply alternating voltage, appearing contact 303, via lead 305 to coils 306 and 307 of solenoids of FIGURE 7 which correspond to the solenoids 174 and 176 of FIGURE 4. The relay coil 306 has associated therewith movable armatures or contacts 308, 309, 310 and 311 while the coil 307 has associated therewith movable armatures or contacts 313, 314, 315 and 316. The coils 306 and 307 and their associated contacts serve the same general purpose as corresponding structures in FIGURE 5 in that they serve to transfer control of the lighting circuits from a conventional controller to the apparatus of the present invention.

Describing the operation of the system of FIGURES 6 and 7, it is assumed that control signals are received in the east-west channel B and that a north-south green is initially displayed. In consequence of the north-south light being energized, a voltage appears on lead 318 and is employed to charge a timing capacitor 319 which times the amber transitional period. The charge on the capacitor 319 is coupled through series connected resistors 321 and 322 to a stationary contact 321 associated with movable contact 316 of the relay coil 307. The armature 316 is connected to ground and thus a discharge circuit is provided for the capacitor 319 which discharges its capacitor relatively rapidly when the voltage is removed from the north-south green light. However, in the present instant it is assumed that the control of the apparatus is assumed by an emergency vehicle during the interval that a high voltage is applied to the lead 318 and therefore a high voltage is developed on the capacitor 319 and is applied to a lead 322. The discharge circuit for capacitor 319 is broken due to the fact that contact is broken between the armature 316 and contact 321. The armature 316 now engages a contact 323 connected to a coil 324 of a solenoid 326. The other end of the coil 324 is connected to the lead 322 so that under these circumstances; that is, when high voltage appears on the lead 322, the relay 326 is energized. The relay 326 has a movable contact 327 connected via lead 325 and contacts 328 and 329 of a solenoid 331 to the contact 304 to which high voltage has been applied via the movable contact 303 of the relay 302. Thus, upon energization of the relay 326, the high voltage appearing on the movable armature 327 is applied via its associated stationary contact 332 to a contact 333 placed in engagement with the movable armature contact 314 as a result of energization of the coil 307. The armature 314 is connected via a lead 334 to north-south amber lights 336 and 337. Concurrently, voltage to the north-south green lights 338 is interrupted as a result of disengagement of the movable armature 311 of the coil 306 from stationary contact 339. The stationary contact 339 is connected via a lead 341 to a terminal 342 which has a voltage applied thereto by the controller whenever a north-south green light 338 is to be illuminated. Thus, upon energization of the coil 306, the connection between the controller terminal 342 and the lead 318 to the north-south green lights 338 is interrupted at the contacts 311 and 339.

After a predetermined length of time as determined by the time constant of the circuit of the capacitor 319; its charging circuit having now been interrupted, the relay 326 is de-energized and the armature 327 becomes disengaged from the contact 332 and engages another stationary contact 345. Disengagement between the contacts 327 and 332 interrupts the circuit to the north-south amber lights 336 and 337 and therefore these lights are de-energized. The high voltage now applied to the stationary contact 345 is coupled via lead 343 and contacts 344 and 346 to a lead 347. The voltage on the lead 347 is applied via stationary contact 348 to the movable armature 309 of the coil 306. The armature 309 is connected via a lead 349 to the north-south red lights 351. Thus, the cycle of operation is such that if a vehicle is approaching from the east or west and there is a green light on north-south, the north-south green is de-energized and the north-south amber is energized. After a predetermined length of time as determined by the timing circuit of capacitor 319, the north-south red lights are illuminated.

The application of alternating voltage to the lead 347 causes a pulsating D.C. voltage to be applied through a rectifier 352 to coil 353 of relay 354 having movable contacts or armatures 356 and 357. The end of the coil 353 remote from the lead 347 is conected via a manual switch 358 to contact 292 which is connected to contact 291 upon energization of the relay 289. The contact 291 is grounded and thus the application of a voltage to the lead 347 energizes the relay 354. The contact 356 is caused to engage stationary contact 358 and the high voltage appearing on the armature 356, as a result of its connection to the contact 304, results in an alternating voltage being applied via a diode 359 back to the coil 353. Thus, this circuit constitutes a holding circuit for the relay 354 which will be maintained so long as the relay 302 is energized. The application of alternating voltage to the stationary contact 358 also applies this voltage to a lead 360 connected to a stationary contact 361 associated with the movable contact 310 of the relay 306. Since, with the coil 306 energized, the contact 310 engages the contact 361 alternating voltage is applied to a lead 362 connected to the east-west green lights 363 and 364. The energizing circuit for the east-west red lights 366 and 367, which lights were energized at the initiation of this cycle, is disconnected from the east-west control box terminal 368 by means of movement of the armature 308 of the coil 306 out of engagement with the stationary contact 369, the contact 369 being connected to the terminal 368 via a lead 371 and the movable contact 308 being connected to the east-west red lights 366 and 367 respectively via a lead 372.

It will be noted that the lead 360 is also connected via a switch 373, normally disposed in the position illustrated for the example under consideration, a lead 374, and a diode 376 to the flasher 297. Thus, the flasher circuit 297 is energized and develops a pulsating voltage on the lead 296 which is supplied to the east-west flasher via contacts 293, 294.

Assuming a second operating example in which the lights are initially green north-south and the vehicle is approaching from either the north or south, actuation of the proper or north or south push button in the transmitter unit produces energization of the relay 263 and causes its movable armature 264 to engage a stationary contact 374. At the same time, the movable armature 266 engages the stationary contact 267 to apply killer bias to the lead 57. Engagement between the contacts 264 and 374 closes the circuit through the coil of the relay 282 and causes its movable contact 281 to engage the stationary contact 376. A second movable contact 377, connected to lead 296, is caused to engage a stationary contact 378 to which the north-south blinker light is connected. Contact between the movable armature 281 and stationary contact 376 causes high voltage to be applied across a coil 379 of a relay 381. The relay 381, when energized, causes armatures 382 and 383 to be attracted toward the coil 379 and establish a circuit between contacts 384 and 386. Coil 331 is now energized from the high voltage lead 305, connected to the stationary contact 304, via contacts 356 and 387 of relay 354, lead 390, a movable contact 388 and a stationary contact 389 of an east-west amber control relay 391, a lead 395 and through movable contact 357 and a stationary contact 392 of the relay 354, and thence through a diode 393. The relay 331 causes the movable contact 320 to engage stationary contact 394 to establish a holding circuit through the coil of the relay 331. At the same time, this causes disengagement of the movable contact 329 from the stationary contact 328 and breaks the circuit to the north-south red lights 351. At the same time contact between the armature 329 and the contact 394 establishes a holding circuit for the north-south green lights via a lead 396, the stationary contact 397 and movable contact 311 of the relay 306 and lead 318 to the north-south green light 338. Thus, even though the original circuit to these lights via lead 341 to the terminal 342 is broken the light is still maintained. It will be noted that even though the relay 326 may be energized as a result of charging of the capacitor 319, the amber control circuit is ineffective since the contacts 328 and 329 are open as a result of energization of the relay 331. Consequently, an amber signal is not displayed.

In the description of the apparatus relating to FIGURES 1 through 5, the cycling motor of the conventional traffic light controller remained de-energized during the cycle of operation of the remote control unit and therefore, the lights can be immediately returned to control of this apparatus by re-energization of the motor. In the present embodiment of the invention, the motor of the conventional controller continues to operate during the interval the apparatus of FIGURES 6 and 7 has control of the lights and therefore, provision must be made to return the circuits to the conventional controller when the controller is calling for the same display of signals at the intersection as the emergency control unit. This is accomplished in the present invention by means of a set of contacts comprising a movable contact 398 and a stationary contact 399 of the relay 302. The stationary contact 399 is connected via a lead 401 and a diode 402 to a set of contacts 403 and 404 of the relay 289. When the relay 289 is not energized the contacts 403 and 404 are bridged by an armature 406 and the contact 404 is connected via a lead 407 to a north-south red output terminal 408 of the traffic light controller. Assuming the example above, that is, when north-south is green under control of the apparatus, when the emergency vehicle passes the intersection the control signal is no longer broadcast to the apparatus and the relay 263 is de-energized. This produces de-energization of the relay 282 and further of the relay 381. Normally, this would produce de-energization of the relay 302. However, if the conventional controller is in the north-south red condition then voltage is applied via the circuit through the diode 402 and the contacts 399 and 398 to lead 409 to the relay 302 so that this relay is maintained in an operative condition. Continued cycling of the apparatus will, of course, cause the voltage to be removed from the north-south terminal 408 at which time the relay 302 will become de-energized, thereby de-energizing the coils 306 and 307 so as to return the apparatus to control of the conventional controller.

The system illustrated in FIGURES 6 and 7 also covers the eventuality that the conventional controller may be applying a north-south amber signal to the apparatus, rather than a north-south red. If the amber signal is near or at the end of its cycle the delay in the circuits of the invention are such as to delay reversion to the conventional controller until the red light was lit causing a sudden switching of the lights from green to red without an amber signal being displayed. Thus, whenever energizing voltage is applied by the controller to the north-south amber terminal 411 voltage is applied via a lead 412, a diode 413 and a lead 415 to the stationary contact 399 so as to mantain the relay 302 energized. Identical operation is obtained when the east-west green signal is displayed and it is desired to return the apparatus to supervision of the automatic controller only when the automatic controller has attained an east-west green condition. This is accomplished by means of a circuit associated with diode 402 and relay 381 for the red signal condition and lead 415 and a diode 420 for the amber condition.

The apparatus illustrated in FIGURES 6 and 7 is capable of other modes of operation as a result of the inclusion of switches 373 and 375 and their associated switches 412 and 358 respectively. Assume for example that the operation of the system is to remain as described above when approaching from north or south, but when approaching from east or west it is wished to cause all lights at the corner to be red. In this situation, the switch 375 is thrown so as to produce engagement between contacts 413 and 414, and concurrently to open the switch 358. Upon energization of the relay 289, the relay 354 is not energized and the contacts 356 and 357 remain in engagement with their respective stationary contacts 387 and 392. The amber signal is flashed since either the capacitor 319 or corresponding capacitor 416, is of necessity charged and temporarily energize either relay 326 or relay 391. Thereafter, the north-south red signals 351 are energized via lead 349, contacts 309 and 348, lead 347, contacts 344 and 346 of the solenoid 331, the contacts 327 and 345 of the solenoid 326 and contacts 328 and 329 of solenoid 331 to the high voltage lead 305. Concurrently, the east-west red signals 366 and 367 are connected via the lead 372 and contacts 308 and 417 of the relay 306 to a lead 418 and via lead 418 to the closed contacts 357 and 392 of the non-energized relay 354, contacts 388 and 389 of the relay 391 and the second set of contacts 356 and 387 of the relay 354 to the high voltage lead 305. Thus, both north-south and east-west lights are red. It will be noted that the lead 418 is also connected to the stationary contact 413 of the switch 375 and thus, applies high voltage to a lead 419 connected via diode 421 to the flasher circuit 297. The east-west indicator light is flashed indicating control from that direction even though all four red signals are lit. It is apparent that four red signals when approaching from the north-south direction may be achieved by changing the position of the switches 373 and 412 while maintaining green in the east-west direction while permitting an approach from the east-west direction to produce green signals for this latter direction. Alternatively, four reds may be provided regardless of the direction of approach by throwing the switches 373, 375, 358, and 412 to the positions opposite to those illustrated, to achieve the same type of operation as described with respect to FIGURES 4 and 5.

It will be noted that the systems previously described utilized at the most only four different push buttons of the control head 1 illustrated in FIGURE 1 of the accompanying drawings. Specifically, the system of FIGURE 5 requires the use of the north-south and east-west buttons whereas the systems of FIGURES 6 and 7 only require a use of two of the buttons of the control head of FIGURE 1 since in this system the flasher flashes in the two opposed directions concurrently rather than only in the single direction from which the vehicle is approaching. Obviously, the system of FIGURES 6 and 7 could be modified to operate in the same manner as the system of FIGURE 5, by inclusion of a tone-sensitive relay to control the flasher so that a light flashes in only the direction of approach at one time. In this case, four buttons of the control head 1 of FIGURE 1 would again be employed.

A system is now described in which the entire capability of the transmission system is employed in traffic light control. Under these circumstances, the button 4 is not employed to control a carrier selection relay 18 and therefore, the transmitter always transmits at a very high frequency as determined by the very high frequency oscillator 16. If desired to also control internal lighting of houses or other buildings, a manual or additional push button may be employed to control the carrier selection relay 18. The system to be described subsequently, which employs all 8 buttons, is illustrated in FIGURE 8 of the accompanying drawings. FIGURE 8 illustrates a series of blocks in a city and a different audio frequency is assigned to control the lights positioned at the various intersections along a given street. For instance, referring to the east-west streets, the lights arranged along A Street are controlled by an 80 cycle signal on subcarrier B. The lights along B Street are controlled by the audio frequency of 141 cycles on the subcarrier, B and C and D Streets are controlled by 174 and 195 cycle audio signals on the subcarrier B. The pattern then repeats itself starting with the E Street, which is controlled by an 80 cycle audio signal on the subcarrier B. The north-south streets are similarly controlled with the lights arranged along F, G, H and I Streets controlled by 80, 141, 174 and 195 cycles per second, respectively, on the subcarrier A. Starting north-south K Street and going east the audio signal patterns are repetitive with those previously mentioned. In many major cities, certain streets are designated as emergency routes or fire lanes for various types of emergency vehicles and it is assumed in the example under consideration that east-west C Street is an emergency route and that the north-south G and I Streets are also emergency routes.

In the present system under consideration, the apparatus of FIGURES 6 and 7 is employed in which two green lights are displayed in opposite directions when an emergency vehicle obtains control of the system. A difficulty with a system of this type is that if the emergency vehicle wants to make a left-hand turn from one emergency route onto another, traffic coming in the opposite direction has a green light and this, of course, is likely to lead to accidents. Therefore, it has been found advisable to turn the green light which controls traffic coming from the opposite direction, to red while maintaining the green light controlling traffic in the direction in which the emergency vehicle is moving in the green condition. It is apparent from the previous description of FIGURES 6 and 7 that the circuitry illustrated therein is not capable of accomplishing this result. However, if the circuit of FIGURE 7 is modified by the addition of the circuit of FIGURE 9 then this condition can be obtained. Referring again for the moment to FIGURE 8, if a vehicle is proceeding along C Street and wishes to turn left on the street G, the button number 1 is depressed and the button E is released. On the other hand, if a vehicle wishes to turn left at the intersection of C and I Streets, the button number 2 is depressed and if the vehicle wishes to turn left at the intersection of C and L Streets, the button W is depressed. As the vehicle proceeds towards the east-west L Street the cycle is repetitive, that is, at the next left turn the button 1 is depressed and the buttons 2 and W would be depressed as the successive emergency routes are approached and the vehicle wished to turn left.

Referring now specifically to FIGURE 9, the apparatus is illustrated which is required to accomplish the intended result. The terminals A, B and C of FIGURE 9 are intended to be connected at the points A, B and C of FIGURE 7, the circuits past the points A, B and C in FIGURE 7 being disconnected. The remainder of the circuitry of FIGURES 6 and 7 is retained, this being illustrated in FIGURE 9 by the inclusion of the relays 263 and 268 in a box labeled 451, which is intended to illustrate all of the circuitry required up to the leads 362, 372 and 450. In addition to the circuitry of the box of 451 there is provided a relay 452 having a coil 453, movable contacts 454 and 456 which cooperate with stationary contacts 457 and 458 respectively. The movable contact 454 is connected to ground while its associated resistor to the input to the coil or the relay 268. The coil 453 is tuned to for instance an 80 cycle signal by means of a capacitor 459. The coil is connected via a lead 461 to the anode load for the A channel stage 84 of FIGURE 3 when this stage is employed as an anode rather than a cathode driver as previously described, When the relay 452 is energized, the relay 268 is also energized by returning one end of the coil to ground while the other end is connected to B+ as illustrated. The movable contact 456 is connected to the ungrounded side of an arc supply while its associated stationary contact 458 is connected to a coil 462 of a relay having movable contacts 463, 464, 465 and 466. The movable contact 463 is grounded while the contacts 464 through 466 are connected to the east amber, red and green lights respectively which are designated by the reference numerals 455, 367 and 363. When the coil 462 is de-energized, the movable contacts 463 through 466 engage stationary contacts 467, 468, 469 and 470 respectively. The contacts 468 through 470 connected to the A, B and C terminals respectively; that is to the leads 450, 372 and 362. Thus, in the absence of energization of the coils 462, if a 174 cycle tone, the tone to which the relay 268 is tuned, is generated on the subcarrier B then the system of FIGURES 6 and 7 operate exactly as described with respect to those figures and the east and west green lights are turned on while the north and south red lights are energized. However, a once a 174 cycle channel B signal has been received, if now a channel A subcarrier is received with an 80 cycle modulation thereon, then the relay 452 is energized and maintains the relay 268 energized through its contacts 454 and 457. The green light 364 remains energized, this light being the green light permitting flow towards the east along C Street. The energization of the relay 452 also energizes the relay 462 so that the movable contacts engage stationary contacts 471, 472, 473 and 474. The contact 474 is not connected while the contact 471 is connected to one end of a relay coil 472. The other end of the relay coil 472 is connected through a resistor 473 to the junction of a timing capacitor 474 and a diode 476. The other terminal of the capacitor 474 is grounded while the anode of the diode 476 is connected through a resistor 477 to the movable contact 466. If the west green light 363 has been energized prior to energization of the relay 462, then the capacitor 474 is charged to a positive voltage so that when the relay 472 is connected to ground through contact 463, the capacitor discharges through the relay coil 472 and to actuate it. The relay 472 has a movable contact 478 normally in engagement with a stationary contact 479 and also has a stationary contact 481. When the relay 472 is energized, the movable contact 478 engages its stationary contact 481 and applies alternating voltage to the west amber light 455. After the capacitor 474 has discharged; that is after about two or three seconds, the movable contact 478 engages the stationary contact 479 and alternating voltage is applied to the west red lamp 367. Therefore, if the vehicle proceeding east along C Street has previously obtained control of the lights at the intersection of C and G Streets, upon actuation of the push button 1 the west amber light is illuminated and then the west red light while the east green light 364 remained energized. Thus, the vehicle may make a left turn without fear of striking an oncoming vehicle. The relay 452 is tuned to different audio frequencies depending upon its location along C Street. The relay situated at the intersection of C and I Streets is tuned to 141 cycles while the relay situated at the intersection of C and L Streets is tuned to 195 cycles. Precisely the same system may be utilized with north bound traffic which wishes to make a left onto the one of the east-west streets except that the relay corresponding to relay 452 is connected to the A channel output circuit and the contact 457 is connected to the relay 263.

The circuit thus far illustrated also is adapted to permit left turns of east bound traffic only and cannot be controlled by a west bound vehicle. Normally, this is not required since the location of the fire stations on these emergency routes is such that under normal circumstances the vehicles are moving in the direction which requires left turns only while proceeding in specific directions. However, if complete flexibility is required then relay systems, as illustrated in FIGURE 9, may be employed with both relays at each intersection. Thus a first relay 452 may be tuned to 80 cycles and control the east lights while a second relay may be tuned to 195 cycles at the same intersection and control the west lighting system. The contacts of the additional relay corresponding to relay 462 and its associated contacts would be included for instance between lead 372 and the light 366 and the corresponding positions in the other light circuits. In order to provided the necessary information to the driver or assistant driver of the emergency vehicle as to which buttons are to be pressed at which intersections, targets or signs may be displayed along the route of the vehicle telling which button to press for the streets that they are proceeding along and then at each intersection or at each emergency cross route giving an additional number telling which button is to be pressed so as to insure a safe left turn.

It is a common practice in many, if not most, cities to change the normal traffic light operation at certain intersections to a blinking operation during the night or other times when the traffic is light. Under these conditions, the traffic signal normally has a blinking amber displayed along the main street and blinking red lights displayed along the intersecting side streets. This type of operation is achieved in the normal controller by either throwing a switch, manually or by means of a timing motor, which switch to connect the input power to the controller to a flasher unit and remove the power from a normal cycling motor. At the same time, the amber lights facing the main street are disconnected from the output terminals of the normal cycling apparatus and connected to the output circuit of the flasher as are the red lights on the cross street. In these systems, the systems when returned to normal operation, is required to display initially a green light on the main street and a red light on the intersecting street. Therefore, a switching system is provided in the controller which stops the timing motor of the normal control apparatus when the switches are in engagement with the green light on the main street and the red light on the cross street. However, since power is removed from the normal control unit, no voltage is supplied to the output leads from this unit. It is apparent that if the equipment responsive to an emergency vehicle is to conform to the traffic code, the system must first switch the lights to green on the main artery and red on the cross street, then cause the system to display the signals in accordance with the emergency condition, thereafter return the system to green lights along the main street and red lights along the side streets and finally return the system to the blinking condition.

The apparatus for accomplishing these operations is illustrated in FIGURE 10 of the accompanying drawings. However, reference is initially made to FIGURE 6 and particularly to the relays 289, 381 and 302. It will be noted the one end of the coil 288 of the relay 289 is connected to a terminal 491, one end of the coil 379 of the relay 381 is connected to a terminal 492 and one end of the coil 301 of the relay 302 is connected to the terminal 493. Normally, these three terminals are connected to the common point of the system or, for instance, ground. However, when this apparatus is to be utilized with the apparatus of FIGURE 10, the ground connections are removed. The terminal 491 is connected through a resistor 496 and diode 497 to a terminal 498. Similarly, the terminal 492 is connected through resistor 499 and a diode 501 to a terminal 502.

Referring now specifically to FIGURE 10, the terminal 493 is connected to a terminal 503 while the terminals 498 and 502 are connected to a terminal 504. Further, the terminal 506 of FIGURE 10 is connected to one of the green light energizing voltage terminals of FIGURE 7. It is not known, without knowing the specific street arrangement involved, to which green light terminal the terminal 506 is connected. If the north-south green signals 338 of FIGURE 7 are arranged along the main street then the terminal 506 is connected to the lead 318 of FIGURE 7. If the east-west green is along the main street, then the terminal 506 is connected to the lead 362.

For purposes of explanation, the portion of the mechanism of the normal controller necessary to an understanding of the flasher operation is illustrated. Specifically, the controller includes a switch 507 having movable contacts 508, 509 and 511. The movable contacts are illustrated in the position to provide flasher operation and engage the stationary contacts 512, 513 and 514. Under normal operation conditions, the movable contacts 508, 509 and 511 engage stationary contacts 516, 517 and 518. The movable contact 511 is normally connected to the hot side of the power line lead 525 and when it is in engagement with the contact 518 supplies operating potential to the cyclic switches of a standard controller unit which are illustrated as enclosed in the box 519. There are actually six distinct output leads from the output unit 519, one each for north-south red, amber and green and one each for east-west red, amber and green. Only two of these output leads are illustrated, the lead 521 which provides the main street or the north-south amber voltage and a lead 522 which provides the east-west red voltage. The lead 521 is connected to the contact 517 so that when the switch 507 is in normal position, the north-south amber voltage appears on a lead 523. The lead 522 is connected to the contact 516 of the switch 507 so that when the switch is in its normal position, energizing voltage for the east-west red appears on a lead 524. However, with the switch 507 thrown to the position illustrated, the ungrounded power lead 525 is connected via lead 526, to the movable contact 511 to supply power to a flasher control 527 which develops a pulsating voltage on a lead 528. This lead is connected to the stationary contacts 512 and 513 of the switch 527 so that a pulsating voltage is applied to leads 523 and 524.

In the normal traffic light system which does not employ the apparatus of the invention, the leads 523 and 524 would be connected respectively to the north-south amber and the east-west red lights. However, in order to provide for control of the system by an emergency vehicle additional apparatus is added. Specifically, there is provided an electromagnetic relay 529 having an energizing coil 531 and movable contacts 532, 533 and 534. The contacts 532, 533 and 534 are normally in engagement with stationary contacts 536, 537 and 538 connected respectively to leads 526, 523 and 524. The movable contact 532 is connected via the lead 525 to the terminal 539 of the ungrounded side power line. The movable contacts 533 and 534 are connected to the terminals 411 and 369 of the light control apparatus of FIGURE 7 and thence to the north-south amber lights 336 and 337 and the east-west red lights 366 and 367 respectively. The relay 529 is also provided with stationary contacts 541, 542 and 543 connected respectively to stationary contacts 518, 517 and 516 of the switch 507. With the apparatus as illustrated in FIGURE 10 the flasher unit is controlling the signal lights so that the amber lights 336 and 337 and the red lights 366 and 367 are flashing.

Upon energization of the relay 529, under the control of circuitry to be described subsequently, the movable contacts 532, 533 and 534 engage stationary contacts 541, 542 and 543. The voltage to the flasher unit 527 is now removed and voltage is applied to the normal control unit 519 which does not initially develop a voltage on the lead 521 for the north-south amber lights but does connect an energizing voltage for the red lamps 366 and 367 on the lead 522. This voltage is connected to the contact 543 of the relay 529 and thence via the movable contact 534 and through the circuits of FIGURE 7 to the red lights 366 and 367. The normal control unit 519 also develops a voltage for the north-south green lights which voltage is maintained for a short period until the remote control unit takes over.

Describing now the operation of the entire circuit and particularly of the circuit of FIGURE 10, whenever an energizing voltage is applied to either of the relays 289 or 381 an energizing voltage is applied to the terminal 504 of FIGURE 10 and thence to a lead 546. Application of voltage to the lead 546 energizes a relay 547 having movable contacts 548 and 549. The movable contact 548 engages stationary contact 551 upon energization of the relay 547 thereby connecting the movable contact 548 to ground. The movable contact 548 is connected via a lead 552 to one end of a coil 553 of a relay 554. The terminal 503 connected to the terminal 493 of FIGURE 6 is also grounded and connects one end of the coil 301 of the relay 302 to ground. Thus the relay 302 is not energized until the relay 547 is energized at which time the coil 301 is grounded. As previously indicated, the time delay between initial presentation of a voltage to the coil 301 and closing of the contacts 303 is approximately three seconds as a result of the time delay in the circuit. During this interval the system is under control of the circuitry of FIGURE 10 rather than under the control of the apparatus of FIGURES 6 and 7.

Energization of the relay 547 also causes the contact 549 to engage its contact 556 to energize the relay 529. The system is returned to the normal controller 519 and immediately north-south green and east-west red lights are displayed. After a time delay of three seconds, the apparatus of FIGURES 6 and 7 take over control so that the green-red pattern described immediately above is maintained or switched depending upon the display called for by the emergency vehicle. It will be noted that the contact 556 of the relay 547 is connected via a lead 558 to a normally closed set of contacts 559 of the relay 554. The contacts 559 are connected in a holding circuit for the relay 547 so this relay is maintained energized even after voltage is removed from the lead 546. Specifically, a voltage is applied to the lead 546 so long as the emergency vehicle has assumed control over the display apparatus. However, as soon as the emergency vehicle passes the corner at which the apparatus is situated, voltage is removed from the lead 546 and at this time the relay 547 is maintained energized only through the holding circuit including contacts 559. Once the emergency vehicle passes the corner, it is desired to return the apparatus to the blinking condition which existed before the emergency vehicle obtained control of the system. The terminal 506 is connected to the main street green terminal which in the example assumed is the north-south green terminal so that when the controller 519 has cycled to a position where the main street green is illuminated a voltage is applied to the terminal 506. This voltage energizes the coil 553 and breaks the holding circuit of the coil 547 by opening the contacts 559. Opening of these contacts allows the relay 547 to be de-energized, which in turn de-energizes the relay 529 and returns the contacts of the relay 529 to the position illustrated in FIGURE 10. The system now returns to the normal flashing condition. It will be noted that the circuits of the coil 553 contains a capacitor 561 and a resistor 562. The capacitor 561 is employed to provide a time delay of more than three seconds so that a green light is maintained along the main street for a sufficient length of time to meet the code requirements. Actually, the time constant provided by the capacitor 561 and resistor 562 must be determined by the code requirement of the particualr jurisdiction so that, although three seconds is mentioned as one figure above, this delay may be greater or lesser as the case may be. However, once the relay 554 is energized, the resistor 562 is disconnected from the circuit so as to insure that the relay 554 is maintained energized a sufficient length of time to insure that the entire system returns to normal. Thus, it is seen that the system of FIGURE 10 provides a mechanism for taking over the operation of a traffic light system when it is under flasher control and first permits a green light to be displayed along a main street for a predetermined interval, thereafter permitting the system of FIGURES 6 and 7 to take over control to provide the display required by the approach of an emergency vehicle and thereafter returning the system to the normal controller 519 so that a green signal is again displayed on the north-south street and thereafter returning the system to flasher operation.

It presently being proposed by civilian defense authorities to designate certain arterial routes in a city as escape routes in case of atomic attack. At present, it is proposed that along these major routes a continuous green light will be employed for one direction and a blinking red light will be employed for all other lights including the lights controlling the cross streets and the lights controlling the flow of traffic along the arterial route in a direction opposite to that which leads out of the city. It is therefore an object of the invention to provide an apparatus which may be employed with the apparatus previously described and which permits the blinking pattern described above to be obtained and further which prevents any override of this pattern by any emergency vehicle. Specifically, it is wished to employ the civilian defense control to disable the entire system of the present invention with the lights displaying the blinking pattern described immediately above.

Referring now specifically to FIGURE 11 of the accompanying drawings it is assumed that the civilian defense channel will be channel B and that a resonant relay is employed at a specific tone. The button for generating this tone at the control head of FIGURE 1 is normally sealed so that it cannot be actuated and the seal is broken only upon orders either from civilian defense headquarters or a military establishment in the locale. When the designated button is depressed, channel B receives a signal and the signal from the tube 90 of FIGURE 3 applies a tone to the resonant relay 92 of FIGURE 4. Energization of the relay 92 causes intermittent closing of a resonant reed actuated contact 566 with the stationary contact being connected to a common lead or ground. The closing of the contacts 566 energize a relay 567 which causes its movable contact 568 to engage a stationary contact 569. Closing of the contacts 568 to 569 energizes a relay 571 having a movable contact 572 normally in engagement with a stationary contact 573. The contact 572 is connected via a lead 574 to 117 volt A.C. power line and the stationary contact 573 is connected to the power supply to the radio receiver of the traffic light control unit. Upon energization of the relay 571 its movable contact 572 is disengaged from the contact 573 and removes all power from the traffic light control apparatus including the radio receiver of the present invention and the power to the conventional traffic light controller so that all control over the system is taken away from these components. The movable contact 572 now engages a stationary contact 576 which via a resistor 577 establishes a holding circuit for the relay 571. Thus, so long as the 117 volt A.C. voltage is maintained on the lead 574, the relay 571 is energized and all normal traffic light controls are discontinued. A reset switch 575 is provided for the apparatus and this may be a manual switch or a remotely controlled switch which permits the system to be returned to normal operation after the civilian defense alert. The contact 576 is also connected to a lead 570 which supplies energy to a relay 578. Upon the application of voltage to lead 570, the relay 578 is energized and causes movable contacts 579, 580 and 581 to be deflected from the right-hand position illustrated in FIGURE 11 to the left-hand position. Normally, when the armatures 579, 580 and 581 are in the right-hand position, the traffic lights are connected to the various leads of the circuit illustrated in FIGURE 7 and more specifically, the leads 349, 362 and 372. The lead 362 which has applied thereto the energizing voltage for the east-west green is connected by means of the armature 581 to the green lights 363 and 364. It will be noted that the armature is connected directly to the light 363 but 364 is connected to the light by bridging two stationary contacts 582 and 583. The north-south red lights 351 are connected by means of the armature 580 to the lead 349 while the east-west red lights 366, 367 are connected to the lead 372 by means of the armature 579. Here again, the red 366 is connected to the armature 579 to movable armature 579 while the red light 367 is connected to the lead 372 by the fact that the armature 579 bridges stationary contacts 584 and 586.

Thus, under normal circumstances of operation when the relay 578 is not energized, the traffic lights are under control of the apparatus of FIGURES 6 and 7 and function as previously described. However, upon receipt of the civilian defense signal the relay 578 is energized and the armatures 579, 580 and 581 are deflected into engagement with stationary contacts 587, 588 and 589 respectively. The stationary contact 589 is connected to the lead 570 and thus, the green light 363 is continuously energized while the green light 364 is de-energized. The contacts 587 and 588 are connected to a lead 591 which has a pulsating voltage applied thereto by means of a flasher unit enclosed within a dashed line box generally designated by the reference numeral 592. In consequence, the red light 366 and the two red lights 351 are energized by a pulsating voltage and flash. The red light 367 is de-energized, this light facing in the same direction as the green light 363. Thus, a pattern is established with one continuous green light the green 363, and three blinking red lights. As previously indicated, when it is desired to convert the system back to normal operation, the switch 575 must be actuated at which time the relay 571 is de-energized and the armature 572 is permitted to engage the stationary contact 573 to supply power to the radio apparatus and to the normal traffic light controller.

The flasher unit enclosed within the box 592 may be employed in each of the various locations throughout the drawings in which a flasher unit is required. For purposes of completeness of description the specific flasher unit employed will now be described although it is to be understood that any electronic or even electromechanical flasher unit may be employed in this apparatus. In the operation of the circuit, the alternating voltage appearing on the lead 570 is rectified by a rectifier 593 and charges capacitors 594 and 596. The capacitor 594 is connected in parallel with a coil 597 of a relay 598 having movable contacts 599 and 601. The movable contact 599 normally engages a stationary contact 602 which is connected to the junction of series connected resistors 603, 604 connected in shunt with the coil 597. Since the contact 599 normally engages the contact 602, a short circuit is established across the resistor 604 and capacitor 596. The half-wave rectified voltage supplied through the diode 593 charges the circuit comprising capacitor 594 and resistor 603 in parallel. Thus, the time constant of the circuit and the charge rate of the capacitor 594 are determined by the value of the resistor 603. When the capacitor 594 has charged to a predetermined value, the relay 597 is energized opening the contacts 599 and 602 and at the same time closing the contact 601 against a stationary contact 606 connected to the lead 591. The contact 601 is connected to the high voltage lead 577 and thus energy is supplied to the lamps.

Upon opening of the contacts 599 and 602, the capacitor 596 is connected in series with the capacitor 594 and the voltage across the capacitor 594 falls below the value required to maintain the coil 597 energized. Thus, a cycle of operation is complete and the capacitor 594 again begins to charge until the relay is actuated, etc. The value of capacitor 603 as previously indicated determines the interval required for the capacitor 594 to charge to a value sufficient to energize the relay 597. The value of the resistor 604 helps to determine the discharge rate of the capacitor 594 and therefore is instrumental in determining the length of time that the coil 597 remains charged. Thus, both the charging and discharge time of this capacitor are independently adjustable so that the cycle of operation may be readily varied in accordance with local traffic regulations.

I claim:
1. A traffic light control system for assuming control over a traffic signal system including a traffic light signal unit having means for displaying red, green and amber lights for controlling traffic approaching an intersection from various directions and a signal controller for effecting periodic and repetitive actuation of the red, green and amber signals in timed relation, said traffic light control system comprising a receiver of electromagnetic waves including a carrier frequency signal modulated selectively by first and second subcarrier frequency signals, each of the subcarrier frequency signals being selectively modulated by various different control signals, a first channel means connected to said receiver and having a band pass characteristic such as to pass the first subcarrier frequency signal and its associated modulating control signals, a second channel means connected to said receiver and having a band pass characteristic such as to pass the second subcarrier frequency signal and its associated modulating control signals, said first and second channel means each terminating in a different demodulator circuit means for recovering the control signal associated with the subcarrier signals of their respective channel means, first means connected to said first channel demodulator means and responsive to said control signal for disconnecting the traffic light unit from the signal controller and causing a first predetermined array of lights to be displayed by the traffic light signal unit, second means connected to said second channel demodulated means and responsive to said control signals for disconnecting the traffic light from the conventional controller and causing a second predetermined array of lights to be displayed by the traffic light signal unit, circuit means in said second channel responsive to actuation of said first means for rendering said second channel means inoperative and circuit means in said first channel responsive to actuation of said second means for rendering said first channel means inoperative.

2. The combination according to claim 1 wherein each of said first and second means includes at least first and second signal responsive devices each responsive to a different control signal, a flasher unit having a number of sources of light equal to the number of different directions of approach to an intersection to be controlled by said traffic light control system, each of said sources of light being visible along only one of the directions of approach to the intersection, and means responsive to actuation of said first and second means for applying a periodically interrupted voltage to one of said sources of light of said flasher unit as determined by the control signal being received.

3. The combination according to claim 1 wherein said first and second means comprises means responsive to a green light being displayed in a direction that is to display a red light under control of said traffic light control system for developing a first voltage, means responsive to said first voltage for causing the traffic light unit to display an amber signal for a predetermined interval and further means responsive to said first voltage for displaying a red signal after said predetermined interval.

4. The combination according to claim 1 wherein said first and second means each include a first further means responsive to one of said control signals to cause two green and two red signals to be displayed in response to a first control signal and a second further means responsive to another control signal for causing one green and three red signals to be displayed.

5. The combination according to claim 1 wherein the signal controller is selectively adapted to display blinking green lights along a main street and blinking red lights along cross streets, said first and second means including a first further means responsive to a control signal for discontinuing the blinking display and for establishing a first condition in which continuous green and red signals are displayed initially along the main and cross streets respectively, a second further means for thereafter switching to the display designated by the control signal, a third further means responsive to discontinuance of said control signal for re-establishing the first condition when the first condition is different from the display designated by the control signal and a fourth further means for thereafter returning the traffic lights to control of the conventional controller for continued display of blinking signals.

6. The combination according to claim 1 wherein each of said first and second means includes at least first and second signal responsive devices each activated in response to a different control signal, means responsive to actuation of each signal responsive device for rendering its associated signal responsive device inoperative.

7. The combination according to claim 6 further comprising a flasher unit having a number of sources of light equal to the number of different directions of approach to an intersection to be controlled by said traffic light control system, each of said sources of light being visible along only one of the directions of approach to the intersection and means responsive to actuation of any one of said first and second signal responsive devices for applying a periodically interrupted voltage to at least one of said sources of light of said flasher unit as determined by which of said signal responsive means is actuated.

8. A traffic light control system for assuming control over a traffic signal system including a traffic light signal unit having means for displaying red, green and amber lights for controlling traffic approaching an intersection from various directions and a signal controller for effecting periodic and repetitive actuation of the red, green and amber signals in timed relation, said traffic light control system comprising a superheterodyne receiver of electrical energy including a carrier signal selectively modulated by at least various control signals, means connected to said receiver for detecting the control signals, control means responsive to a control signal for disconnecting the traffic light signal unit from the signal controller and further means responsive to said control signal for causing the traffic light system to display an array of lights as determined by the control signal received, a flasher unit having a number of light sources equal to the number of directions of approach to the intersection and arranged so that each light source may be viewed along only one of the directions of approach and means responsive to energization of said control means for applying periodically interrupted electrical energy to at least one of said light sources of said flasher unit arranged for viewing only along a predetermined direction of approach to the intersection as determined by the control signal received.

9. The combination according to claim 8 further comprising a source of periodically interrupted voltage and means responsive to energization of said control means for energizing said source.

10. A traffic light control system for assuming control over a traffic signal system including a traffic light signal unit having means for displaying red, green and amber lights for controlling traffic approaching an intersection from various directions and a signal controller for effecting periodic and repetitive actuation of the red, green and amber signals in timed relation, said traffic light control system comprising a superheterodyne receiver of electrical energy including a carrier signal selectively modulated by at least various control signals, means connected to said receiver for detecting the control signals, control means responsive to the control signal for disconnecting said traffic light signal unit from said signal controller and means for energizing said traffic light signal unit to display an array of lights as determined by the control signal received, and circuit means responsive to a specific control signal for de-energizing said receiver so as to render said system inoperative in response to further control signals.

11. The combination according to claim 10 said circuit means further comprising means for causing a periodically interrupted voltage to be applied to at least one green light and to the red lights controlling traffic in all other directions.

12. A traffic light control system for assuming control over a traffic signal system including a traffic light signal unit having means for displaying red, green and amber lights for controlling traffic approaching an intersection from various directions and a signal controller for effecting periodic and repetitive actuation of the red, green and amber signals in timed relation, said traffic light control system comprising a superheterodyne receiver of electrical energy including a carrier signal selectively modulated by at least various control signals, means connected to said receiver for detecting the control signals, control means responsive to the first control signal for disconnecting said traffic light signal unit from said signal controller and means for energizing said traffic light signal unit to display an array of lights as determined by the control signal received, wherein said control means causes two green and two red signals to be displayed in response to a first control signal and means responsive to another control signal, only after response of said control means to said first control signal, for causing one green and three red signals to be displayed.

References Cited by the Examiner

UNITED STATES PATENTS

| | | | |
|---|---|---|---|
| 2,203,871 | 6/1940 | Koch | 340—33 |
| 2,579,470 | 12/1951 | Brown | 343—228 |
| 2,881,409 | 4/1959 | Cook | 340—33 |
| 2,903,674 | 9/1959 | Schwab | 340—33 |

NEIL C. READ, *Primary Examiner.*

THOMAS B. HABECKER, *Examiner.*